US012310523B2

(12) United States Patent
Yeom

(10) Patent No.: US 12,310,523 B2
(45) Date of Patent: May 27, 2025

(54) COOKING DEVICE

(71) Applicant: CUCHEN CO., LTD, Seoul (KR)

(72) Inventor: Kyu Hyun Yeom, Chungcheongnam-do (KR)

(73) Assignee: CUCHEN CO., LTD, Seoul (KR)

( * ) Notice: Subject to any disclaimer, the term of this patent is extended or adjusted under 35 U.S.C. 154(b) by 0 days.

(21) Appl. No.: 18/724,625

(22) PCT Filed: Jun. 28, 2022

(86) PCT No.: PCT/KR2022/009223
§ 371 (c)(1),
(2) Date: Jun. 27, 2024

(87) PCT Pub. No.: WO2023/132418
PCT Pub. Date: Jul. 13, 2023

(65) Prior Publication Data
US 2024/0415313 A1    Dec. 19, 2024

(30) Foreign Application Priority Data

Jan. 4, 2022 (KR) .................. 10-2022-0000929

(51) Int. Cl.
A47J 27/08        (2006.01)
(52) U.S. Cl.
CPC ....... *A47J 27/0815* (2013.01); *A47J 27/0804* (2013.01); *A47J 27/0813* (2013.01); *A47J 27/0806* (2013.01)
(58) Field of Classification Search
CPC ................ A47J 27/0804; A47J 27/0806; A47J 27/0813; A47J 27/0815
See application file for complete search history.

(56) References Cited

FOREIGN PATENT DOCUMENTS

| CN | 1565321 A | 1/2005 |
|----|-----------|--------|
| CN | 103654375 A | 3/2014 |
| CN | 111358287 A | 7/2020 |
| CN | 211212701 A | 8/2020 |
| JP | 3161839 U | 8/2010 |

(Continued)

OTHER PUBLICATIONS

WIPO, International Search Report for International Application No. PCT/KR2022/009223, Apr. 6, 2023.

(Continued)

*Primary Examiner* — Reginald Alexander
(74) *Attorney, Agent, or Firm* — Nicholas Park

(57) ABSTRACT

The technical idea of the present disclosure provides a cooking device including: a main body; an inner pot accommodated in the main body; and a main body lid connected to the main body and configured to cover the inner pot. The main body lid includes: a top plate; a rotation cover; a locking structure, wherein the locking structure is configured to linearly move between a locking position and an unlocking position in conjunction with the rotation of the rotation cover, wherein the locking position is a position where the engagement protrusion overlaps the flange of the inner pot in a vertical direction and the unlocking position is a position that is spaced apart outward from the locking position in a radial direction; and a pressing slider configured to elastically support the locking structure in a direction from the locking position toward the unlocking position.

5 Claims, 19 Drawing Sheets

(56) References Cited

FOREIGN PATENT DOCUMENTS

| JP | 2019-051112 A | 4/2019 | |
|----|----|----|----|
| KR | 10-1999-0086757 A | 12/1999 | |
| KR | 10-0797149 B1 | 1/2008 | |
| KR | 10-2009-0108449 * | 10/2009 | .......... A47J 27/0813 |
| KR | 10-2013-0012394 * | 2/2013 | .......... A47J 27/0813 |
| KR | 10-2019-0043950 A | 4/2019 | |
| KR | 10-2021-0050328 A | 5/2021 | |
| WO | WO-2011128577 A2 * | 10/2011 | .......... A47J 27/0813 |

OTHER PUBLICATIONS

KIPO, Notice of refusal to grant a patent issued in Korean application No. 10-2022-0000929, Dec. 20, 2023.
Amendment and Response to Notice of refusal to grant a patent issued in Korean application No. 10-2022-0000929, Dec. 20, 2023.
KIPO, Notice of refusal to grant a patent issued in Korean application No. 10-2022-0000929, Mar. 12, 2024.
Amendment and Response to Notice of refusal to grant a patent issued in Korean application No. 10-2022-0000929, Mar. 12, 2024.
KIPO, Decison to grant a patent issued in Korean application No. 10-2022-0000929, May 30, 2024.

* cited by examiner

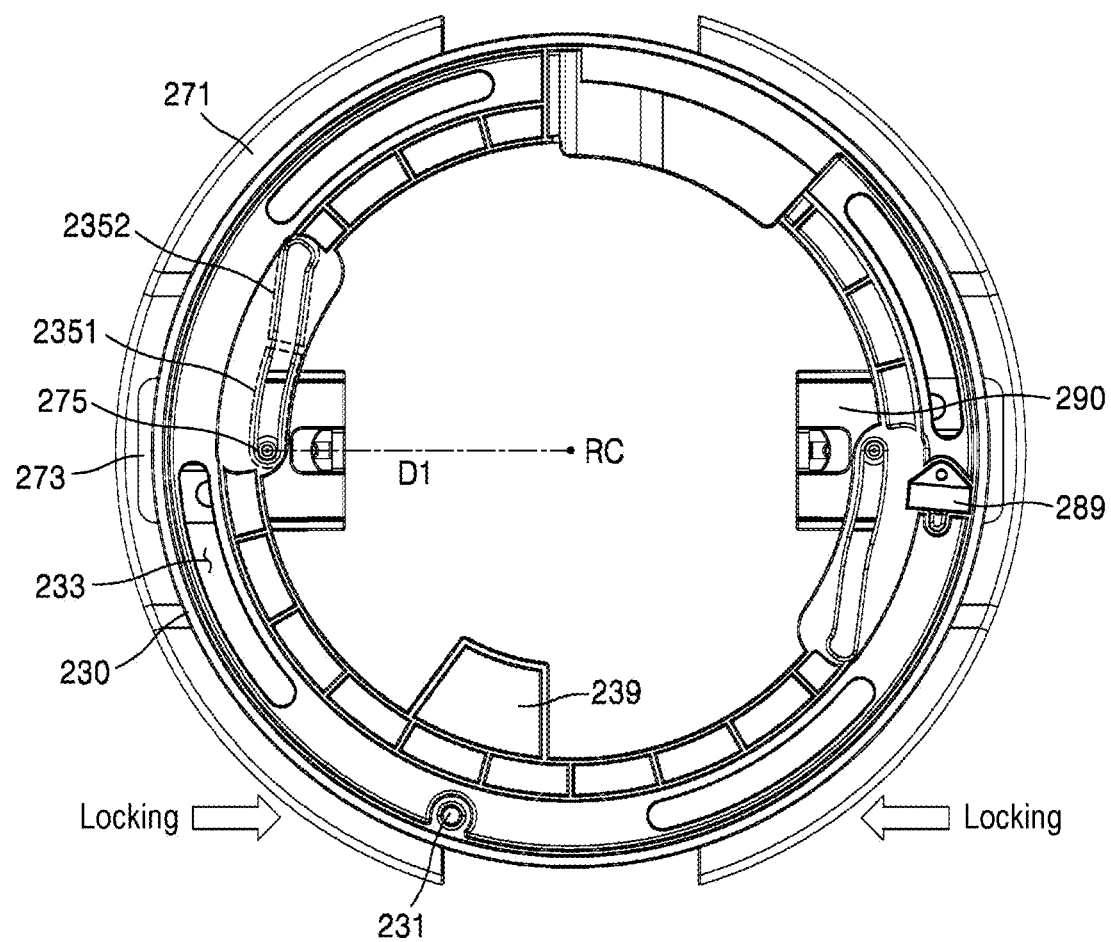

| Rotation Position of Manipulation Handle | 1st Rotation Position | 2nd Rotation Position | 3rd Rotation Position |
|---|---|---|---|
| Position of Guide Protrusion | 1st Position P1 | 2nd Rotation P2 | 3rd Rotation P3 |
| Position of Locking Structure | Locking Position | Locking Position | Unlocking Position |
| Position of Lift Pin | Pin-down | Pin-down or Pin-up | Pin-up |

COOKING DEVICE

CROSS-REFERENCE TO RELATED APPLICATION

This application is the National Phase of PCT International Application No. PCT/KR2022/009223, filed Jun. 28, 2022, which claims the benefit of Korean Application No. 10-2021-0000929, filed Jan. 4, 2022, which is hereby incorporated by reference herein in their entirety.

TECHNICAL FIELD

The technical idea of the present disclosure relates to a cooking device.

BACKGROUND

In general, as a representative example of a cooking device, an electric pressure rice cooker is a device capable of selectively performing a cooking function for cooking rice and a warming function for maintaining cooked rice at a constant temperature. In an electric pressure rice cooker, a main body lid in which a steam discharge hole is formed may be installed on a main body to be openable/closable, an inner pot may be detachably built in the main body, and an inner pot lid may be separately provided to cover the inner pot. An induction heating-type or hot plate-type heater is provided in the main body to transfer heat to the cooking ingredients accommodated in the inner pot, such as rice, mixed grains, or other food ingredients, so that the cooking ingredients can be cooked. Since this electric pressure cooker cooks cooking ingredients under a high pressure, effective sealing of the space within the inner pot is essential to maintain the high pressure within the inner pot.

SUMMARY

A problem to be solved by the technical idea of the present disclosure is to provide a cooking device.

In order to solve the above-mentioned problem, the technical idea of the present disclosure provides a cooking device including: a main body; an inner pot accommodated in the main body; and a main body lid connected to the main body and configured to cover the inner pot. The main body lid may include: a top plate configured to cover the inner pot; a rotation cover disposed on the top plate to be rotatable along the circumference of the top plate; a locking structure including an engagement protrusion configured to be engaged with a flange of the inner pot, wherein the locking structure is configured to linearly move between a locking position and an unlocking position in conjunction with the rotation of the rotation cover, wherein the locking position is a position where the engagement protrusion overlaps the flange of the inner pot in a vertical direction and the unlocking position is a position that is spaced apart outward from the locking position in a radial direction; and a pressing slider configured to elastically support the locking structure in a direction from the locking position toward the unlocking position.

In exemplary embodiments the pressing slider may include: a fixed body; a movable body configured to move linearly within the fixed body, wherein the movable body is in contact with the locking structure; and a spring provided between the fixed body and the movable body to provide a restoring force to move the movable body in a direction away from a center of the rotation cover.

In exemplary embodiments the rotation cover may include a guide groove including a first section spaced apart from the center of the rotation cover by a first distance and a second section spaced apart from the center of the rotation cover by a distance greater than the first distance, the locking structure may further include a guide protrusion that is accommodated in the guide groove and moves within the guide groove depending on a rotation angle of the rotation cover, the locking structure may be located at the locking position while the guide protrusion is located within the first section of the guide groove, and the locking structure may move between the locking position and the unlocking position while the guide protrusion moves within the second section of the guide groove.

In exemplary embodiments the cooking device may further include: a poise valve including a cylinder including a flow path communicating with an accommodation space in the inner pot, and a weight configured to open/close the flow path in the cylinder depending on a steam pressure within the inner pot; and a lift pin configured to be raised and lowered between a pin-down position and a pin-up position depending on the rotation angle of the rotation cover, wherein the lift pin may be located at the pin-up position to lift the weight such that an outlet of the flow path in the cylinder is forcibly opened.

In exemplary embodiments the lift pin may be located at the pin-down position while the guide protrusion moves within the first section of the guide groove, and the lift pin may be located at the pin-up position while the guide protrusion moves within the second section of the guide groove.

In exemplary embodiments the cooking device may further include a cover assembly removably fastened to the main body lid, and the main body lid may further include a fixing post protruding downward from the top plate. The cover assembly may include: a cover plate configured to cover the inner pot; a packing coupled to a circumference of the cover plate, having a ring shape extending along the circumference of the cover plate, and disposed between the inner pot and the top plate, wherein the packing is configured to seal a gap between the inner pot and the top plate; and a handle provided in a central portion of the cover plate and including an insertion groove into which the fixing post is inserted. The packing may include: a ring-shaped central body including a fastening groove into which the cover plate is fitted, and extending along the circumference of the cover plate; an upper close contact protrusion extending inward from the central body to be inclined upward and having a ring shape extending along the central body, wherein the upper close contact protrusion is in continuous contact with the top plate; a lower close contact protrusion extending inward from the central body to be inclined downward and having a ring shape extending along the central body, wherein the lower close contact protrusion is in continuous contact with the inner pot; at least one upper air groove provided on a top surface of the central body; and at least one lower air groove provided in a bottom surface of the central body.

According to exemplary embodiments of the present disclosure, the locking structure is configured to linearly slide in conjunction with the rotation of the rotation cover, wherein the switching of the locking structure between the locking position and the unlocking position can be achieved through linear sliding of the locking structure. In addition, according to exemplary embodiments of the present disclosure, since the pressing slider that provides an external force for sliding of the locking structure is included, the reproducibility and safety of the operation of the locking structure can be improved.

BRIEF DESCRIPTION OF THE DRAWINGS

FIGS. 8A to 8C are plan views illustrating the operation of the locking structure according to the rotation angle of the rotation cover.

DETAILED DESCRIPTION

Figure 1:
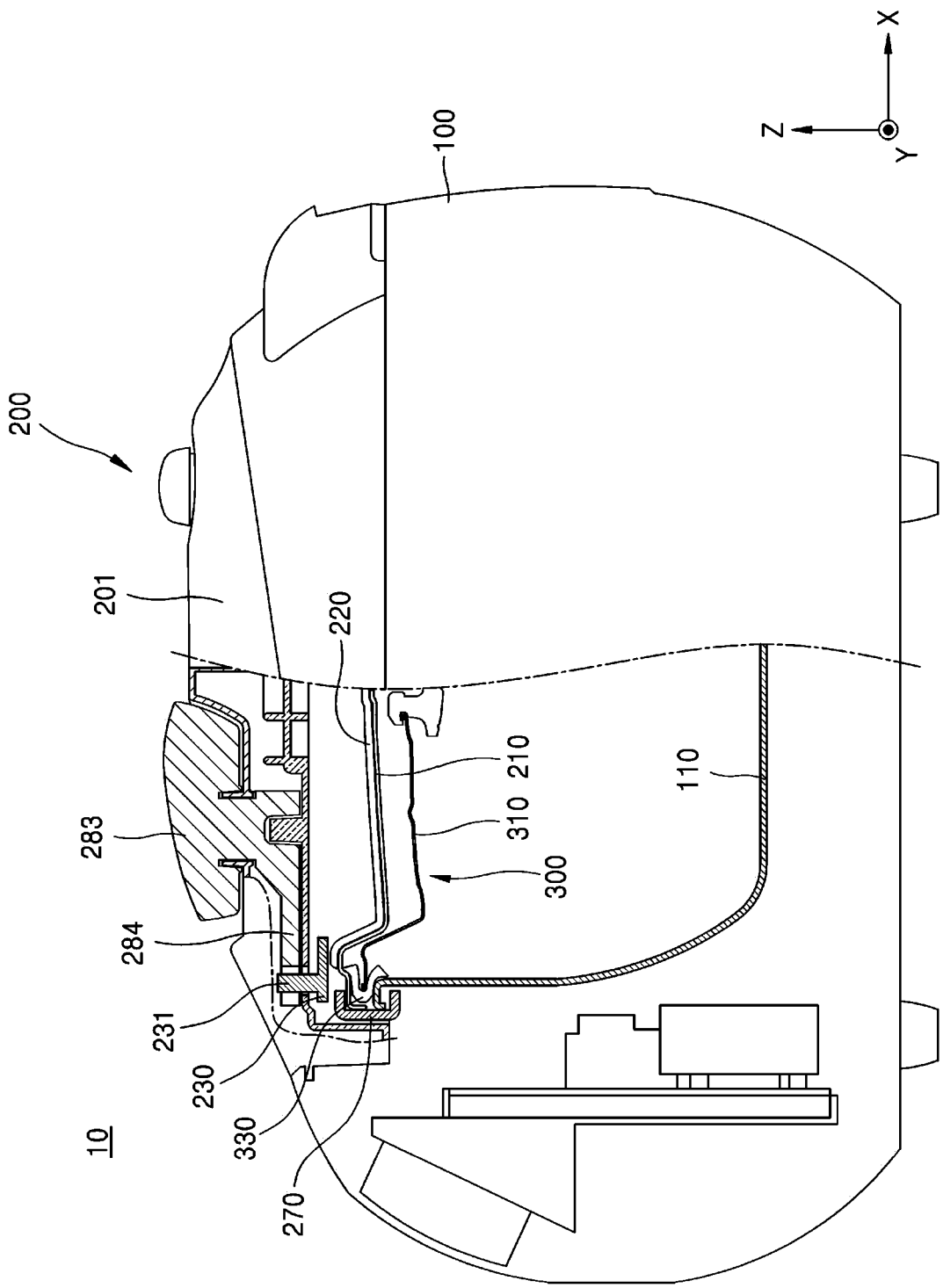
FIG. 1 a configuration view illustrating a cooking device according to exemplary embodiments of the present disclosure.

Hereinafter, embodiments of the present disclosure will be described in detail with reference to the accompanying drawings. However, the embodiments of the present disclosure may be modified in many different forms, and the scope of the present disclosure should not be construed as being limited due to the embodiments to be described in detail below. It is desirable to interpret the embodiments of the present disclosure as being provided to more completely explain the present disclosure to those ordinarily skilled in the art. The like reference numerals indicate like elements throughout the specification and drawings. Further, various elements and regions are schematically drawn in the drawings. Accordingly, the concepts of the present disclosure are not limited by the relative sizes or spacings drawn in the accompanying drawings.

Unless defined otherwise, all terms used herein, including technical terms and scientific terms, have the same meaning as commonly understood by a person ordinarily skilled in the art to which the concept of the present disclosure pertains. In addition, it will be understood that commonly used terms, as defined in dictionaries, should be interpreted as having meanings consistent with what the terms mean in the context of the relevant technology, and should not be interpreted in an overly formal sense unless explicitly defined here.

Figure 2:
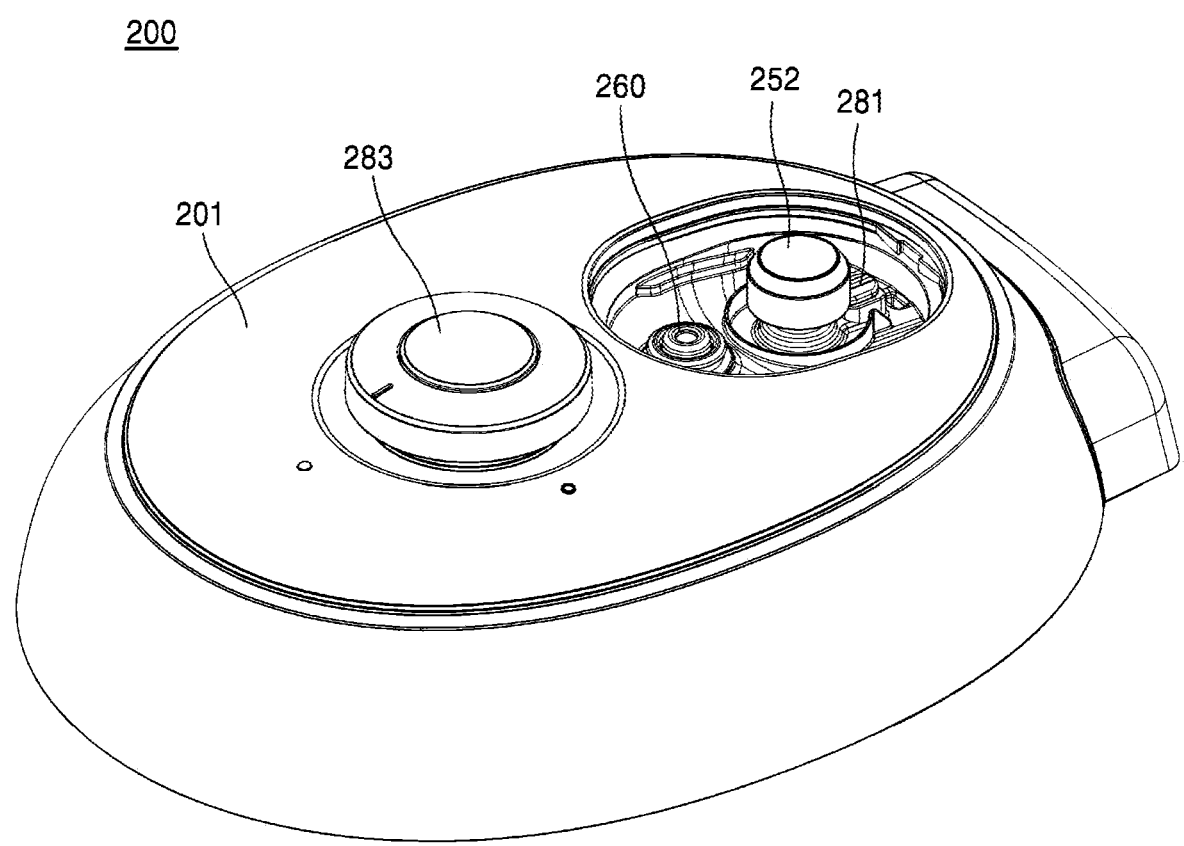
FIG. 2 is a perspective view illustrating the exterior of a main body lid of the cooking device.
Figure 3:
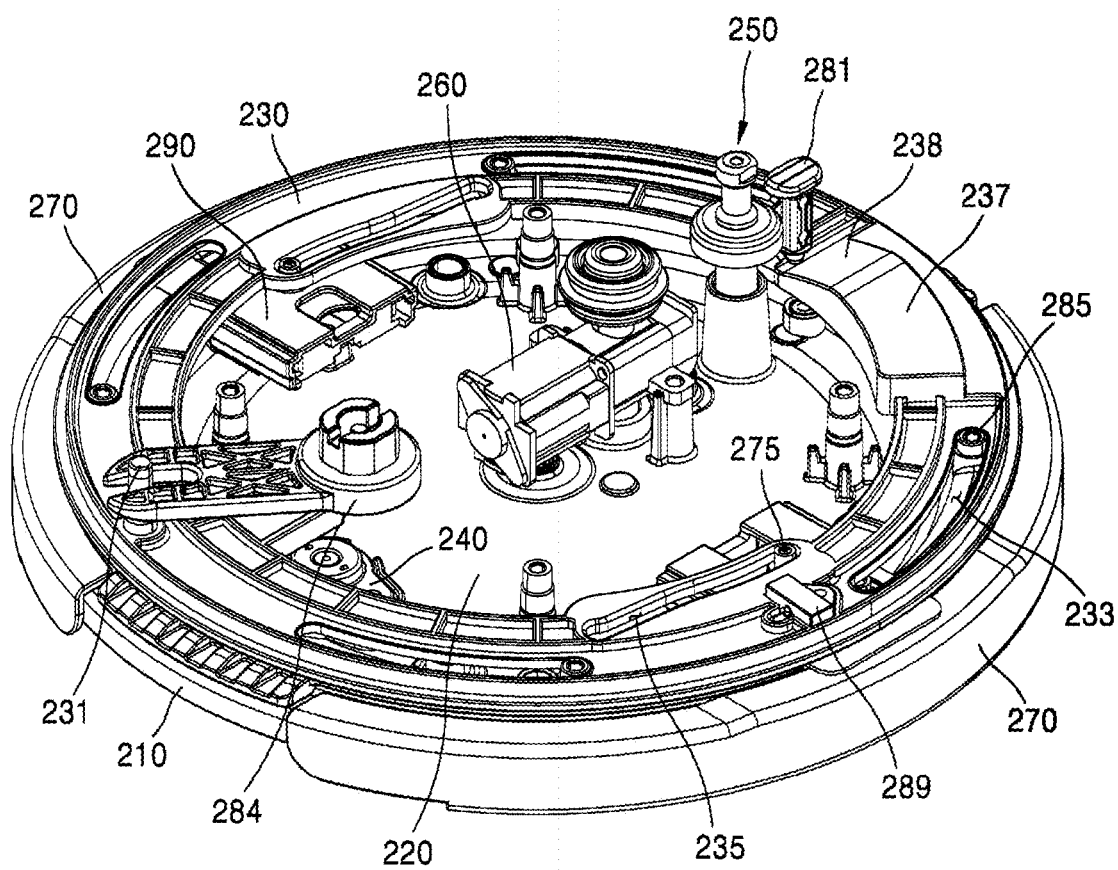
FIG. 3 is a perspective view illustrating the interior of the main body lid of the cooking device.
Figure 4:
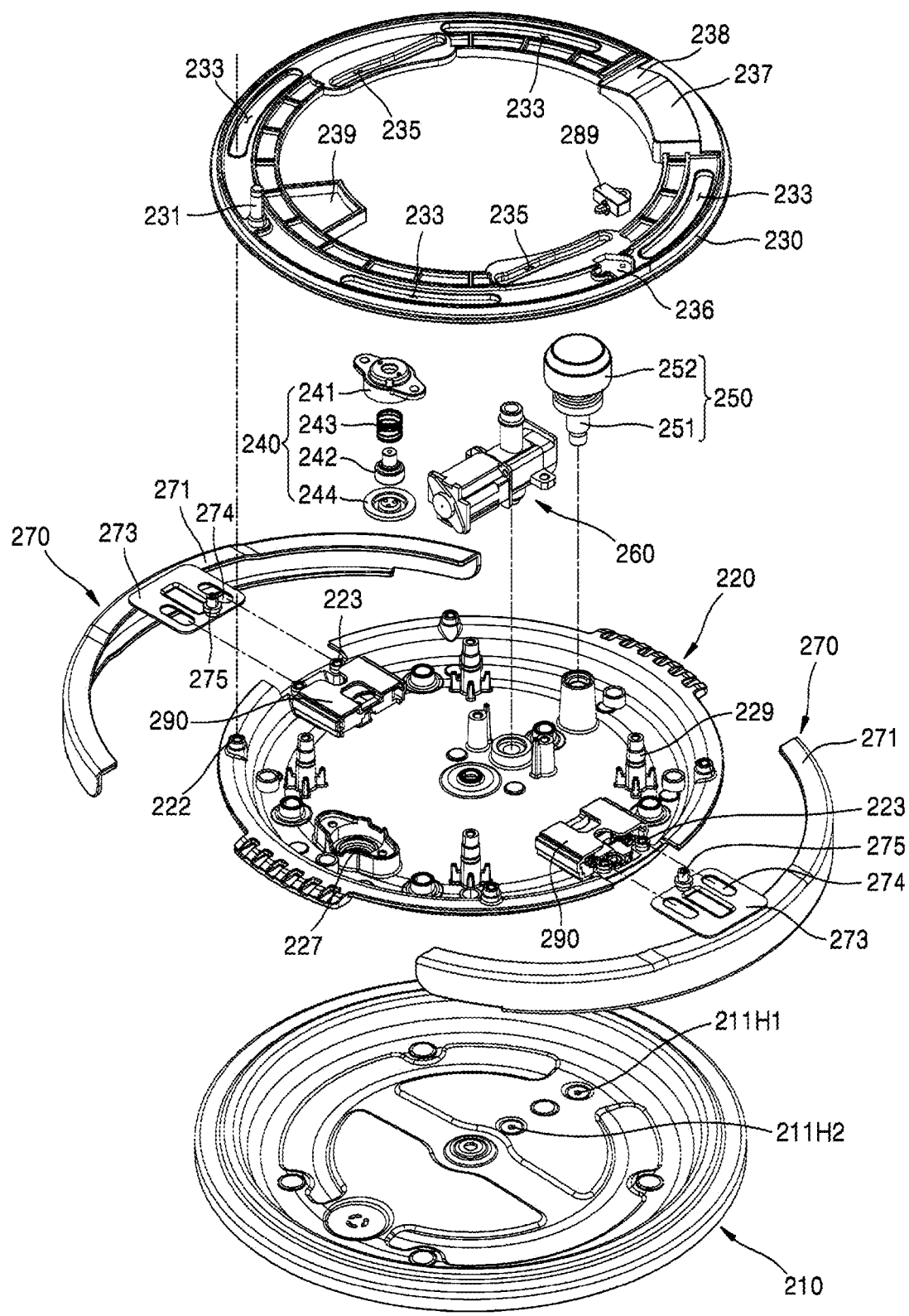
FIG. 4 is an exploded perspective view illustrating the main body lid of the cooking device.

FIG. 1 is a configuration view illustrating a cooking device 10 according to exemplary embodiments of the present disclosure. FIG. 2 is a perspective view illustrating the exterior of a main body lid 200 of the cooking device 10. FIG. 3 is a perspective view illustrating the interior of the main body lid 200 of the cooking device 10. FIG. 4 is an exploded perspective view illustrating the main body lid 200 of the cooking device 10.

Referring to FIGS. 1 to 4, the cooking device 10 may include a main body 100 including a cooking space in which cooking ingredients can be cooked, an inner pot 110 accommodated in the cooking space in the main body 100, a main body lid 200 installed on the main body 100 to open/close the cooking space in the main body 100, and a cover assembly 300 removably mounted on the main body lid 200.

The inner pot 110 has a container shape and may have an accommodation space in which cooking ingredients are accommodated. The inner pot 110 may be removably mounted in the cooking space in the main body 100. In exemplary embodiments, the inner pot 110 may include an outwardly protruding flange (see 111 in FIG. 9A) around the upper end thereof. The flange 111 may extend along the circumference of the upper end of the inner pot 110. The main body 100 may include a heating source for heating the cooking ingredients accommodated in the inner pot 110. For example, the main body 100 may include a hot plate-type heater or an induction heating-type heater.

The main body lid 200 may cover and seal the cooking space in the main body 100 and the accommodation space in the inner pot 110 such that an appropriate pressure is formed in the cooking space in the main body 100 while cooking is in progress for cooking ingredients. For example, the main body lid 200 may be detachably coupled to the main body 100 and may be configured to open/close the cooking space in the main body 100 and the accommodation space in the inner pot 110. In exemplary embodiments, the main body lid 200 may be hinged to the upper portion of the main body 100 to rotate about a rotation axis, and may open or close the cooking space in the main body 100 or the accommodation space in the inner pot 110 by rotating about the rotation axis. In other exemplary embodiments, the main body lid 200 may be removably coupled to the main body 100.

The main body lid 200 may include a lid frame 201, a top plate 210, a support plate 220, a rotation cover 230, a safety structure 240, a poise valve 250, a solenoid valve 260, a locking structure 270, and a pressing slider 290.

The lid frame 201 may be coupled to the main body 100. The lid frame 201 may form the exterior of the main body lid 200. The lid frame 201 may provide a space within which various electrical components can be installed.

The top plate 210 may be placed on the lower portion of the main body lid 200 facing the inner pot 110. The top plate 210 may cover the inner pot 110 accommodated in the main body 100. The top plate 210 may include a first steam hole 211H1 and a second steam hole 211H2 which communicate with the accommodation space in the inner pot 110.

The top plate 210 may be installed within the main body lid 200 to be movable within a predetermined range in a vertical direction (e.g., the Z direction or a direction perpendicular to a reference surface (e.g., a XY plane) on which the cooking device 10 is placed). For example, the top plate 210 may be configured to move within a predetermined range in the vertical direction depending on the steam pressure within the inner pot 110. For example, the top plate 210 may be configured to move between a raised position spaced apart from the inner pot 110 in the vertical direction by a first distance and a lowered position spaced apart from the inner pot 110 in the vertical direction by a second distance smaller than the first distance. The raised position of the top plate 210 may be a position when the steam pressure within the inner pot 110 is relatively high, and the lowered position of the top plate 210 may be a position when the steam pressure within the inner pot 110 is relatively low. For example, when the steam pressure within the inner pot 110 switches from the low pressure to the high pressure, the top plate 210 moves upward (that is, in the direction from the lowered position of the top plate 210 toward the raised position), and when the steam pressure within the inner pot 110 switches from the high pressure to the low pressure, the top plate 210 may move downward (that is, in the direction from the raised position of the top plate 210 toward the lowered position). When the top plate 210 is moved, the cover assembly 300 and the support plate 220 fixedly coupled to the top plate 210 may be configured to move together with the top plate 210.

The support plate 220 may be provided within the lid frame 201. The support plate 220 is disposed on the top plate 210 and may be fixedly coupled to the top plate 210. The support plate 220 may have a substantially disk-like shape. Various components may be mounted on the support plate 220.

The rotation cover 230 may be placed on the top plate 210. The rotation cover 230 may have a ring shape continuously extending substantially along the circumference of the top plate 210. The rotation cover 230 may be mounted on the top plate 210 to be rotatable along the circumference of the top plate 210. The rotation cover 230 may be configured to rotate in a first rotation direction (e.g., clockwise) and a second rotation direction (e.g., counterclockwise) opposite to the first rotation direction about a vertical direction (e.g., the Z direction) as a rotation axis.

The rotation cover 230 may be configured to rotate in conjunction with the rotation of a manipulation handle 283 protruding from the lid frame 201. The rotation of the manipulation handle 283 in the first rotation direction may cause the rotation cover 230 to rotate in the first rotation direction, and the rotation of the manipulation handle 283 in the second rotation direction may cause the rotation cover 230 to rotate in the second rotation direction. That is, the rotation angle of the rotation cover 230 (e.g., the angle of the rotation cover 230 measured from a reference position) may be adjusted by adjusting the rotation angle of the manipulation handle 283 (e.g., the angle of the manipulation handle 283 measured from the reference position).

More specifically, the manipulation handle 283 and the rotation cover 230 may be connected to each other via a connection lever 284 which rotates about the rotation axis of the manipulation handle 283 when the manipulation handle 283 rotates. One end of the connection lever 284 may be connected to the manipulation handle 283, and the other end of the connection lever 284 may be engaged with a connection protrusion 231 of the rotation cover 230. For example, when the manipulation handle 283 is rotated by a user's manipulation, the connection lever 284 may rotate in conjunction with the rotation of the manipulation handle 283, and the rotation cover 230 connected to the connection lever 284 via the connection protrusion 231 may rotate along the circumference of the top plate 210.

The rotation cover 230 may be configured to rotate on the top plate 210 within a predetermined rotation angle range. The rotation cover 230 may include a rotation restriction groove 233 extending in an arc shape along the rotation direction of the rotation cover 230 or along the circumference of the rotation cover 230. The rotation restriction groove 233 may limit the rotation movement range of the rotation cover 230 while guiding the rotation movement of the rotation cover 230.

More specifically, a fastening structure 285 such as a screw may be inserted into a boss 222 of the support plate 220 below the rotation restriction groove 233 through the rotation restriction groove 233. The rotation of the rotation cover 230 may be restricted between a position where the fastening structure 285 is engaged with one end of the rotation restriction groove 233 and a position where the fastening structure 285 is engaged with the other end of the rotation restriction groove 233.

The poise valve 250 may be configured to control the pressure of the accommodation space in the inner pot 110 by controlling the discharge of steam depending on the pressure level of the accommodation space in the inner pot 110. The poise valve 250 may be configured to maintain the pressure (i.e., steam pressure) of the accommodation space in the inner pot 110 at a predetermined pressure by using a weight 252. The poise valve 250 may include a cylinder 251 mounted on the support plate 220 and the weight 252 disposed on the cylinder 251. The cylinder 251 includes a flow path that communicates with the accommodation space in the inner pot 110 through the first steam hole 211H1, and the weight 252 may be configured to open/close an end (i.e., the outlet) of the flow path of the cylinder 251 depending on the pressure level of the accommodation space in the inner pot 110. When the pressure (i.e., steam pressure) of the accommodation space in the inner pot 110 is equal to or higher than a predetermined pressure, the weight 252 may be lifted to open the end of the flow path of the cylinder 251, and the steam, which has flown into the flow path of the cylinder 251, may be disposed to the outside. When the pressure (i.e., steam pressure) of the accommodation space in the inner pot 110 is less than a predetermined pressure, the weight 252 may close the end of the flow path of the cylinder 251.

The solenoid valve 260 may be mounted on the support plate 220. The solenoid valve 260 may be configured to adjust the pressure of the accommodation space in the inner pot 110 by discharging the steam in the accommodation space in the inner pot 110 in response to an electrical control signal. The solenoid valve 260 may include an inner flow path that communicates with the accommodation space in the inner pot 110 through the second vapor hole 211H2 in the top plate 210, and may be configured to selectively open/close the inner flow path in response to an electrical control signal applied from a controller (e.g., a microcomputer) of the cooking device 10. For example, the solenoid valve 260 may function to quickly release the residual pressure in the inner pot 110 to the outside by opening the inner flow path when cooking is completed.

The locking structure 270 may be configured to move between a locking position where the locking structure 270 is locked with respect to the flange 111 of the inner pot 110 and an unlocking position where the locking structure 270 is unlocked with respect to the flange 111 of the inner pot 110. The switching of the locking structure 270 between the locking position and the unlocking position may be configured to be performed in conjunction with the rotation of the rotation cover 230.

The locking structure 270 is mounted on the top plate 210 and may include an engagement protrusion (277 in FIG. 9A) configured to be selectively engaged with the flange 111 of the inner pot 110. The locking position of the locking structure 270 may be a position where the engagement protrusion 277 of the locking structure 270 overlaps the flange 111 of the inner pot 110 in the vertical direction, and the unlocking position of the locking structure 270 may be a position where the engagement protrusion 277 of the locking structure 270 does not overlap the flange 111 of the inner pot 110 in the vertical direction. While cooking is in progress for the cooking ingredients contained in the inner pot 110, the locking structure 270 may be located at the locking position, and when the engagement protrusion 277 is fixed to the inner pot 110, the inner port 110 and the top plate 210 may be firmly fixed to each other. The locking structure 270 will be described in more detail later.

The pressing slider 290 may provide an external force to move the locking structure 270 in one direction. For example, the pressing slider 290 may provide an external force to slide the locking structure 270 from the locking position toward the unlocking position. The pressing slider 290 will be described in more detail later.

The safety structure 240 may be configured to selectively allow or limit the rotation of the rotation cover 230. For example, when a high pressure is formed within the inner pot 110 as in the case of cooking, the safety structure 240 may limit the rotation of the rotation cover 230 to limit the movement of the locking structure 270 configured to slide in conjunction with the rotation of the rotation cover 230. The safety structure 240 will be described in more detail later.

Figure 5:
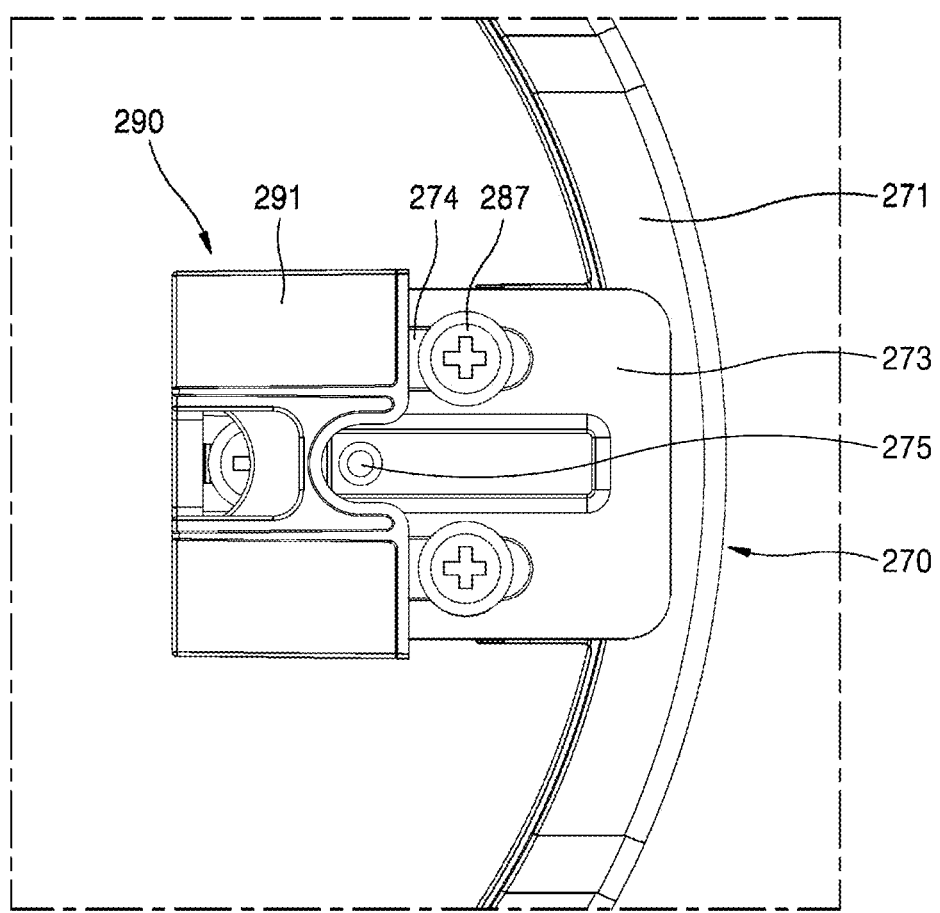
FIG. 5 is a plan view illustrating a locking structure and a pressing slider.
Figure 6:
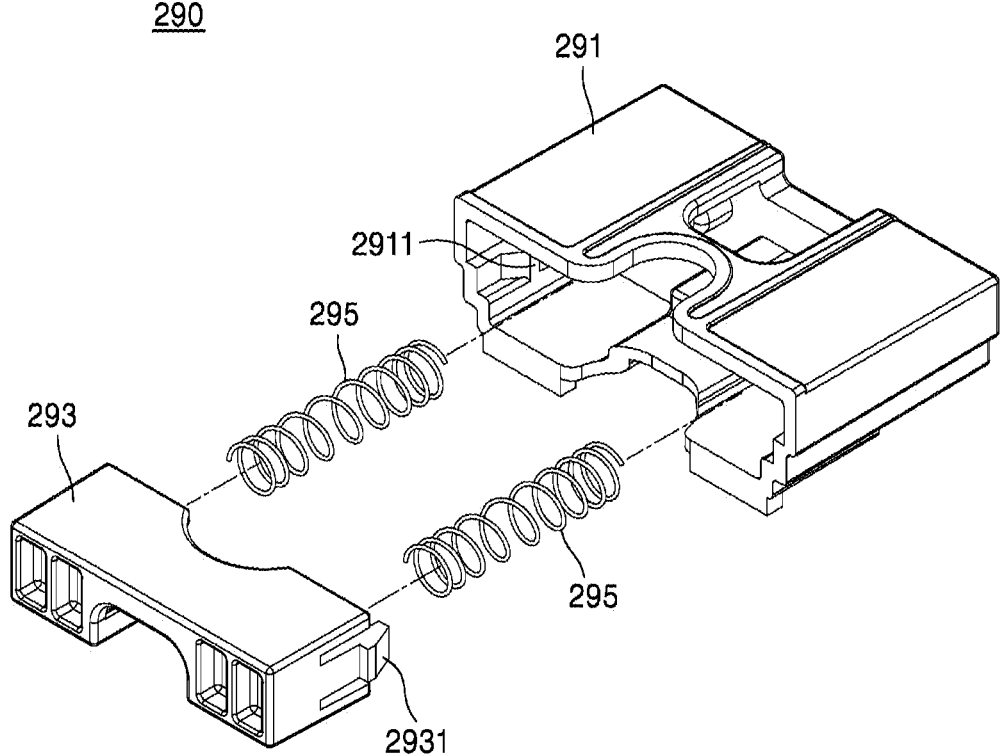
FIG. 6 is an exploded perspective view of the pressing slider.
Figure 7:
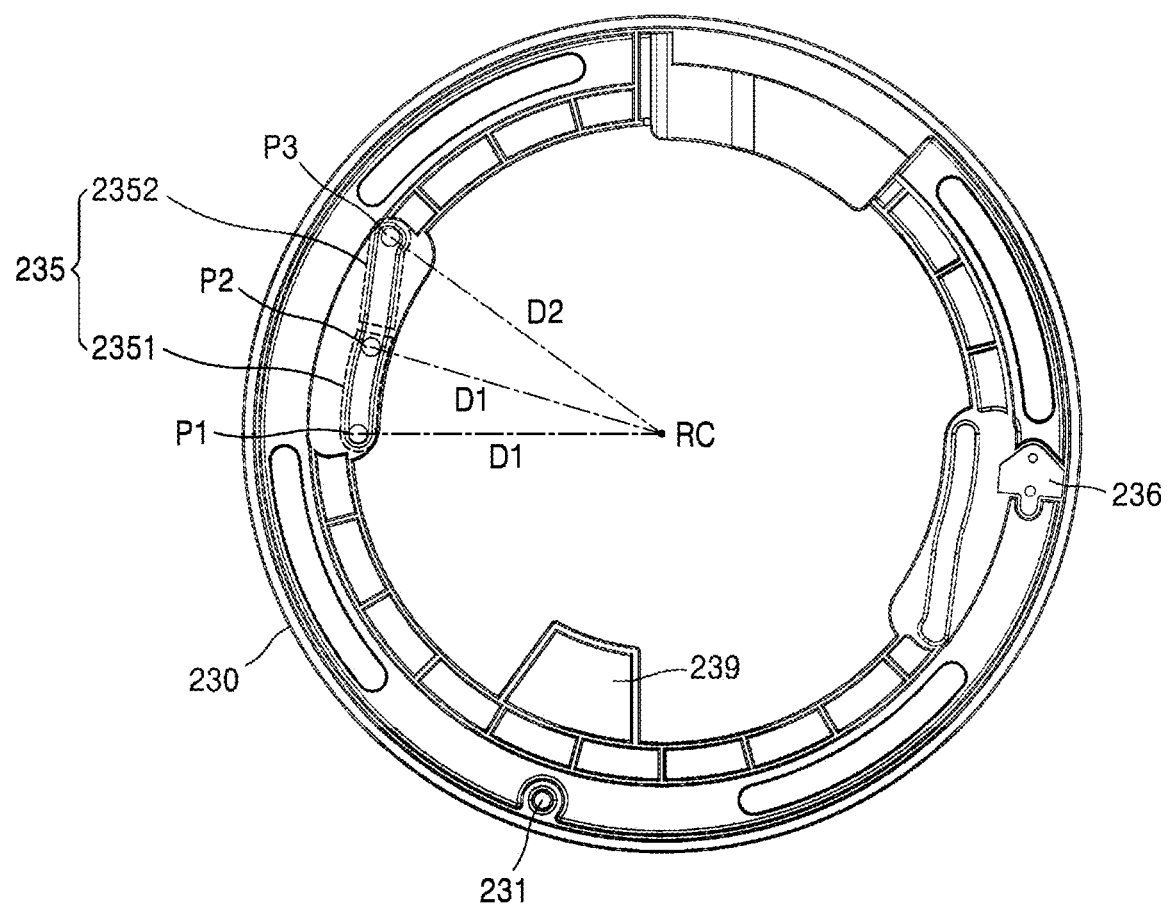
FIG. 7 is a plan view illustrating a rotation cover.
Figure 8B:
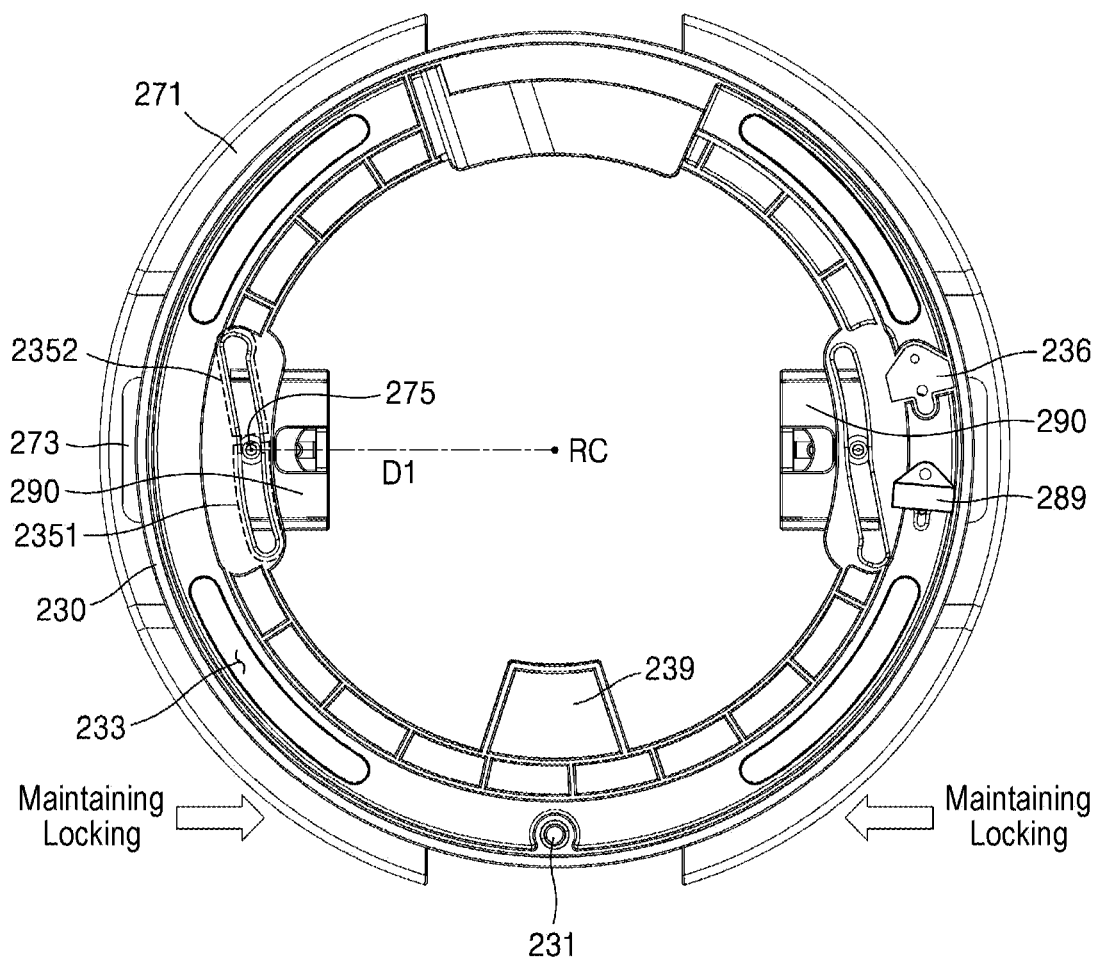
Figure 8C:
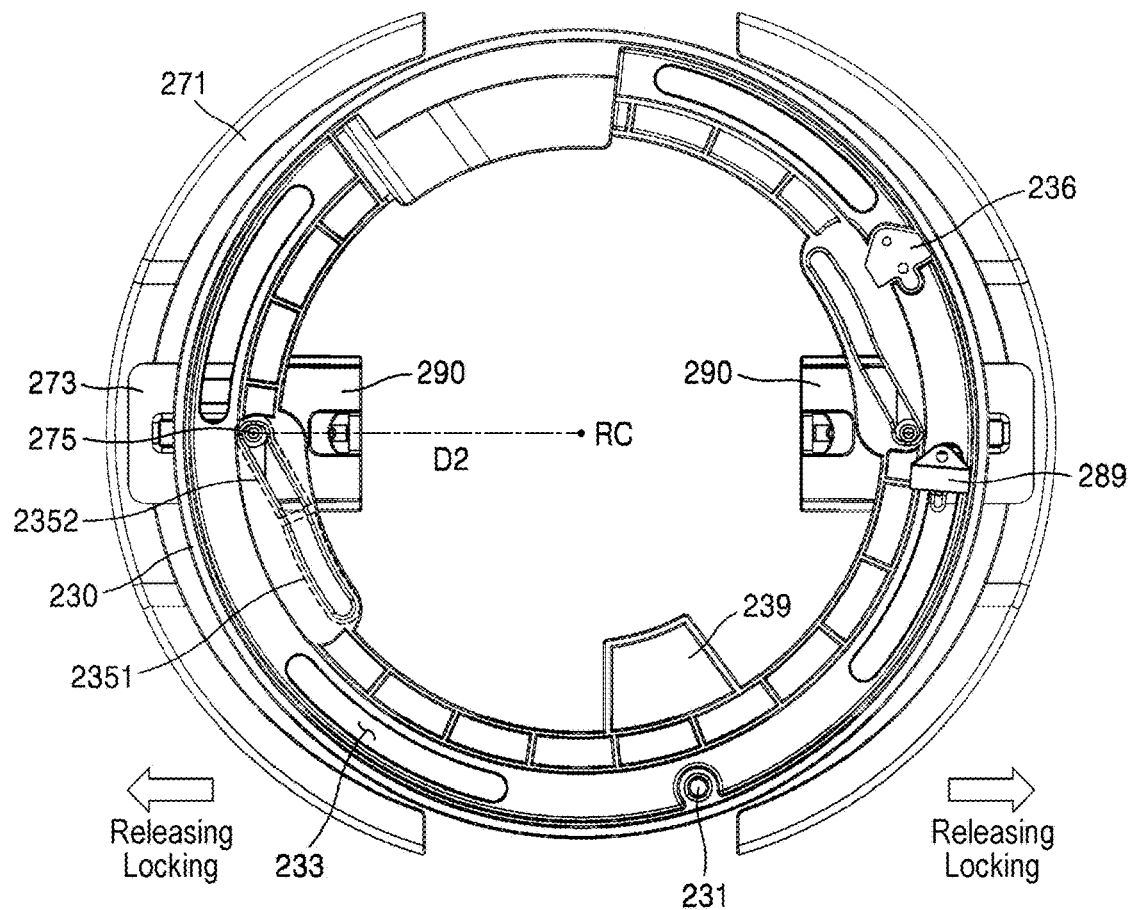
Figure 9A:
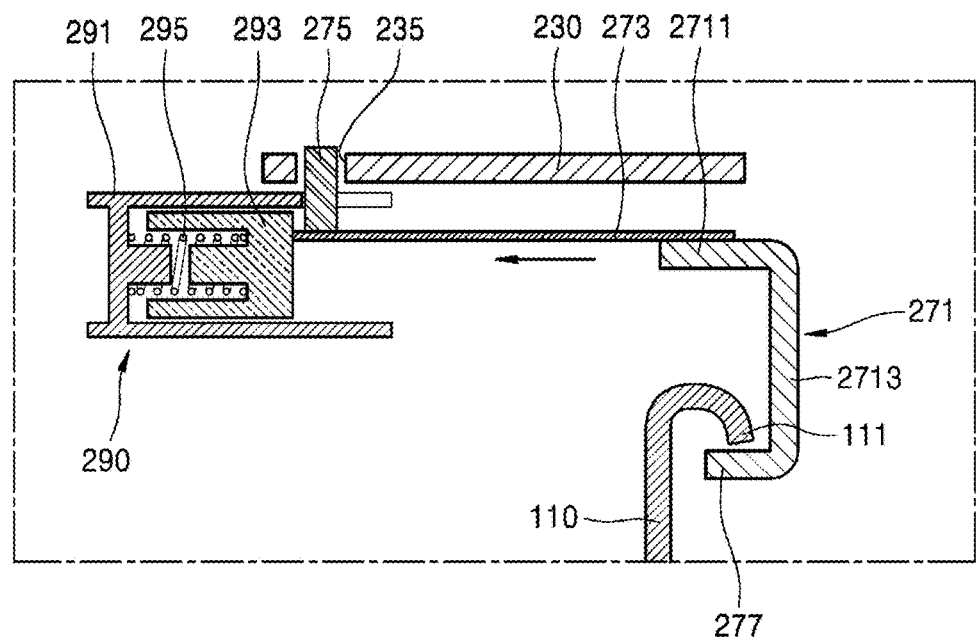
FIGS. 9A and 9B are schematic views illustrating the operations of the locking structure and the pressing slider according to the rotation of the rotation cover.
Figure 9B:
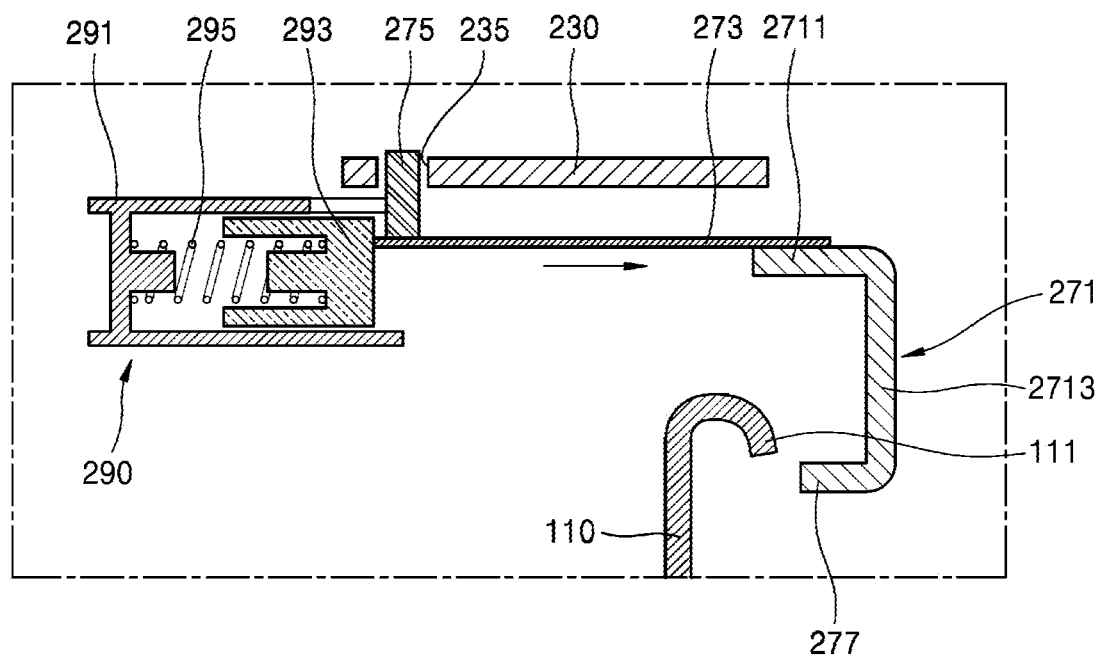

FIG. 5 is a plan view illustrating the locking structure 270 and the pressing slider 290. FIG. 6 is an exploded perspective view of the pressing slider 290. FIG. 7 is a plan view illustrating the rotation cover 230. FIGS. 8A to 8C are plan views illustrating the operation of the locking structure 270 depending on the rotation angle of the rotation cover 230, in which the states of the locking structure 270 when the guide protrusion 275 is located at first to third positions P1, P2, and P3 of a guide groove 235 are illustrated. FIGS. 9A and 9B are schematic views illustrating the operations of the locking structure 270 and the pressing slider 290 according to the rotation of the rotation cover 230, in which FIG. 9A illustrates the state of the locking structure 270 at the locking position, and FIG. 9B illustrates the state of the locking structure 270 at the unlocking position.

Referring to FIGS. 5 to 9B together with FIGS. 1 to 4, the locking structure 270 may include a locking blade 271 extending along the circumference of the top plate 210 and having a curved shape in a plan view. The locking blade 271 may include a side wall 2713 that surrounds the top plate 210 and the packing 330 of the cover assembly 300 coupled to the bottom of the top plate 210 in a lateral direction, an upper body 2711 extending inward from the upper end of the side wall 2713 to be in contact with the top surface of the top plate 210, and a lower body extending inward from the lower end of the side wall 2713. The lower body of the locking blade 271 may include an engagement protrusion 277 configured to be fixedly engaged with the flange 111 of the inner pot 110.

The locking structure 270 may include a connection plate 273 connected to the upper body 2711 of the locking blade 271. The connection plate 273 may be disposed between the top plate 210 and the rotation cover 230 in the vertical direction. The connection plate 273 may include a groove 274 extending in a straight direction. The groove 274 in the connection plate 273 may guide the linear movement of the locking structure 270 while limiting the movement range of the locking structure 270. More specifically, a fastening structure 287 such as a screw may be inserted into a boss 223 of the top plate 210 through the groove 274 of the connection plate 273. The linear movement of the locking structure 270 may be limited between the position where one end of the groove 274 is engaged with the locking structure 287 and the position where the other end of the groove 274 is engaged with the locking structure 287.

The rotation cover 230 may include a guide groove 235 extending in a curved shape generally along the rotation direction of the rotation cover 230, and the connection plate 273 of the locking structure 270 may include a guide protrusion 275 inserted into the guide groove 235 in the rotation cover 230. While the rotation cover 230 rotates, the linear movement of the locking structure 270 may be implement by physical interference between the rotation cover 230 and the guide protrusion 275 accommodated in the guide groove 235.

In exemplary embodiments, as exemplified in FIG. 7, the guide groove 235 may include a first position P1, a second position P2, and a third position P3, which are sequentially disposed between one end and the other end of the guide groove 235 along the extending direction of the guide groove 235. The first position P1 of the guide groove 235 may be a position at one end of the guide groove 235, the third position P3 of the guide groove 235 may be a position at the other end of the guide groove 235, and the second position P2 of the guide groove 235 may be a position between the first position P1 and the third position P3 of the guide groove 235. The first position P1 and the second position P2 of the guide groove 235 may be spaced apart from the rotation center RC of the rotation cover 230 by a first distance D1, and the third position P3 of the guide groove 235 may be spaced apart from the rotation center RC of the rotation cover 230 by a second distance D2 greater than the first distance D1. In exemplary embodiments, in the guide groove 235, the section between the first position P1 and the second position P2 may be referred to as a locking section 2351, and the section between the second position P2 and the third position P3 may be referred to as a sliding section 2352. The locking section 2351 may be a section spaced apart from the center of rotation RC by the first distance D1, and the sliding section 2352 may be a section spaced apart from the rotation center RC by the first distance D1 to the second distance D2.

Depending on the rotation angle of the rotation cover 230, the relative position of the guide protrusion 275 with respect to the guide groove 235 varies. While the guide protrusion 275 relatively moves in the locking section 2351 of the guide groove 235, which is spaced apart from the rotation center RC of the rotation cover 230 by substantially the same first distance D1, the locking structure 270 may be fixed to the locking position where the engagement protrusion 277 can be engaged with the flange 111 of the inner pot 110. While the guide protrusion 275 relatively moves in the sliding section 2352 of the guide groove 235, which is spaced apart from the rotation center RC of the rotation cover 230 by the second distance D2 greater than the first distance D1, the locking structure 270 may be slid between the locking position and the unlocking position spaced outward from the locking position in the radial direction. While the guide protrusion 275 moves in the sliding section 2352 of the guide groove 235, the locking structure 270 may move outward or inward in the radial direction. Specifically, while the guide protrusion 275 moves from the second position P2 toward the third position P3 in the guide groove 235, the locking structure 270 moves outward in the radial direction. In contrast, while the guide protrusion 275 moves from the third position P3 toward the second position P2 of the guide groove 235, the locking structure 270 moves inward in the radial direction.

In exemplary embodiments, the main body lid 200 may be provided with a reed switch 289 configured to detect the rotation angle of the rotation cover 230. The reed switch 289 is fixed to the lid frame 201, and the relative distance between the reed switch 289 and the marker 236 changes while the rotation cover 230 rotates. The reed switch 289 may detect a marker 236 attached to the rotation cover 230 and configured to rotate together with the rotation cover 230 and may generate an electrical signal. The marker 236 may be a magnetic object, for example, a magnet. For example, when the guide protrusion 275 is located at the first position P1 of the guide groove 235, the reed switch 289 and the marker 236 of the rotation cover 230 may be located to overlap each other in the vertical direction, and the reed switch 289 may generate a first operation signal. In addition, when the guide protrusion 275 deviates from the first position P1 of the guide groove 235 and is located between the second position P2 and the third position P3, the reed switch 289 and the marker 236 of the rotation cover 230 are spaced apart from each other by a predetermined distance, and the reed switch 289 may generate a second operation signal.

The controller of the main body 100 may receive the electrical signal from the reed switch 289 and may control the operation of components of the cooking device 10, such as an exhaust assembly, based on the electrical signal. For example, when the pressure in the inner pot 110 is relatively high as in the case where cooking is in progress in the cooking device 10, the rotation cover 230 is unintentionally rotated due to an external collision, and when the reed switch 289 and the marker 236 of the rotation cover 230 are spaced apart from each other by a predetermined distance, the controller may open the internal flow path of the solenoid valve 260 based on the second operation signal generated by the reed switch 289. In this case, the steam in the inner pot 110 may be discharged through the solenoid valve 260, thereby preventing a safety accident.

Referring to FIGS. 8A and 8B, while the guide protrusion 275 moves within the locking section 2351 through counterclockwise rotation of the rotation cover 230 linked to the rotation of the manipulation handle 283, the position of the locking structure 270 can be maintained at the locking position, and the locking state between the locking structure 270 and the inner pot 110 can be maintained.

Referring to FIGS. 8B and 8C, while the guide protrusion 275 moves within the sliding section 2352 through counterclockwise rotation of the rotation cover 230 linked to the rotation of the manipulation handle 283, the locking structure 270 can be moved outward in the radial direction from the locking position to the unlocking position, and the locking state between the locking structure 270 and the inner pot 110 can be released.

The pressing slider 290 may be configured to elastically support the locking structure 270 in a direction away from the rotation center RC of the rotation cover 230 (or in a direction away from the center of the top plate 210). That is, the locking structure 270 may be elastically supported by the pressing slider 290 in a direction from the locking position to the unlocking position. While the locking structure 270 moves radially outward from the locking position to the unlocking position in conjunction with the rotation of the rotation cover 230, the pressing slider 290 may apply an external force (e.g., a restoring force) for linear movement of the locking structure 270. In addition, the pressing slider 290 elastically supports the locking structure 270, so that the locking structure 270 located at the unlocking position can be prevented from unintentionally moving to the locking position due to an external impact or the like.

In exemplary embodiments, the external force provided by the pressing slider 290 may act as an auxiliary for the linear movement of the locking structure 270. In other words, the linear movement of the locking structure 270 may be primarily implemented by the force applied via the manipulation handle 283, and the external force provided by the pressing slider 290 may act as an auxiliary to the linear movement of the locking structure 270 during the period in which the guide protrusion 275 moves in the sliding section 2352 and the locking structure 270 moves outward in the radial direction.

In other exemplary embodiments, the linear movement of the locking structure 270 from the unlocking position to the locking position may be implemented independently or primarily by an external force provided by the pressing slider 290. That is, when the guide protrusion 275 is moved from the first position P1 to the second position P2 by the force applied via the manipulation handle 283 in the operation of switching the locking structure 270 from the locking position to the unlocking position, the movement of the guide protrusion 275 from the second position P2 to the third position P3 can be implemented independently or primarily by the external force provided by the pressing slider 290.

The pressing slider 290 may include a fixed body 291, a movable body 293, and springs 295.

The fixed body 291 may be fixedly coupled to the support plate 220. The fixed body 291 may provide therein a space into which the movable body 293 and the springs 295 can be inserted. The movable body 293 may be movably mounted in the fixed body 291 and may be connected to the connection plate 273 of the locking structure 270. The movable body 293 may be accommodated within the fixed body 291 and may be configured to move linearly within the fixed body 291. The springs 295 may be disposed between the movable body 293 and the fixed body 291. The springs 295 may include, for example, compression springs. The movable body 293 may include engagement hooks 2931 that are engaged with engagement blocks 2911 of the fixed body 291. The engagement between the engagement hooks 2931 of the movable body 293 and the engagement blocks 2911 of the fixed body 291 may limit the linear movement range of the movable body 293, and may prevent the movable body 293 from being separated from the fixed body 291.

The springs 295 may provide a restoring force to linearly move the movable body 293. The spring 295 may provide a restoring force to linearly move the movable body 293 in a direction from the locking position of the locking structure 270 toward the unlocking position (or in a direction away from the center of the rotation cover 230). The restoring force provided by the springs 295 may be applied to the connection plate 273, which is in contact with or is connected to the movable body 293, via the movable body 293 and may cause the linear movement of the locking structure 270 from the locking position to the unlocking position. More specifically, while the guide protrusion 275 moves from the first position P1 to the second position P2 when the locking structure 270 switches from the locking position to the unlocking position, the movable body 293 is in the fixed state and the compression amount of the springs 295 does not change, but while the guide protrusion 275 moves from the second position P2 to the third position P3, the restoring force of the springs 295 may move the movable body 293 and the locking structure 270 in contact with the movable body 293 outward.

In exemplary embodiments, the movable body 293 may be configured to move linearly by the elastic restoring force provided by two springs 295, which are spaced apart from each other with the guide protrusion 275 interposed therebetween.

The safety structure 240 may be mounted on the support plate 220. The safety structure 240 may be configured to come into contact with a safety protrusion 239 protruding inward from the inner periphery of the rotation cover 230. The safety structure 240 may be configured to physically interfere with the safety protrusion 239 of the rotation cover 230 to limit unintentional rotation of the rotation cover 230. For example, when the pressure within the inner pot 110 is relatively high (e.g., 1.2 kgf/cm$^2$ or higher) as in the case of cooking using the cooking device 10, the movement of the locking structure 270 that slides in conjunction with the rotation of the rotation cover 230 can be restricted by restricting the rotation of the rotation cover 230. For example, while cooking using the cooking device 10 in progress, the guide protrusion 275 is located at the first position P1 of the guide groove 235, and the locking structure 270 is located at the locking position to be engaged with the inner pot 110, in which case the safety structure 240 is capable of restricting the rotation of the rotation cover 230 to prevent the locking structure 270 from unintentionally moving toward the unlocking position.

The safety structure 240 may include a case 241 fastened to the mounting structure 227 of the support plate 220, a bottom cover 244 coupled to the support plate 220 to cover a through-hole in the support plate 220, a safety protrusion 242 accommodated in the case 241 and disposed on the bottom cover 244, and a spring 243 configured to elastically support the safety protrusion 242 downward. The bottom cover 244 is made of a material with excellent elasticity and may include, for example, a diaphragm. The safety protrusion 242 may be configured to be raised and lowered within the case 241. For example, the safety protrusion 242 may be configured to be raised and lowered between a raised position where the safety protrusion 242 protrudes upward from the case 241 to be capable of physically interfering with the safety protrusion 239 of the rotation cover 230 and a lowered position where the safety protrusion 242 is lowered from the raised position not to interfere with the safety protrusion 239 of the rotation cover 230. The spring 243 may provide a restoring force to the safety protrusion 242 in a direction from the raised position to the lowered position of the safety protrusion 242.

The vertical position of the safety protrusion 242 may be determined depending on the pressure level within the inner pot 110. For example, when the pressure within the inner pot 110 is relatively high (e.g., 1.2 kgf/cm$^2$ or higher) as in the case where cooking using the cooking device 10 is in progress, the bottom cover 244 exposed through the through-hole in the support plate 220 and the safety protrusion 242 on the bottom cover 244 are pressed by steam pressure, and the safety protrusion 242 pressed by steam pressure overcomes the elastic force of the spring 243 and is raised to the raised position. In contrast, when the pressure within the inner pot 110 is relatively low (e.g., a pressure at a level substantially equal to or similar to atmospheric pressure), the safety protrusion 242 may be fixed at the lowered position by the elastic force of the spring 243.

When the safety protrusion 242 is located at the raised position, the safety protrusion 242 may be located on the movement trace of the safety protrusion 239 of the rotation cover 230 and may come into contact with the side wall of the safety protrusion 239 to restrict the rotation of the rotation cover 230. For example, while cooking using the cooking device 10 is in progress, the guide protrusion 275 is located at the first position P1 of the guide groove 235 and the locking structure 270 is located at the locking position where the locking structure is engaged with the inner pot 110, in which case the safety protrusion 242 comes into contact with the side wall of the safety protrusion 239 to limit the rotation of the rotation cover 230, so that the locking structure 270 can be prevented from unintentionally moving to the unlocking position.

When the safety protrusion 242 is located at the lowered position, since the safety protrusion 242 is lowered not to interfere with the safety protrusion 239 of the rotation cover 230, the rotation of the rotation cover 230 and the sliding of the locking structure 270 linked to the rotation of the rotation cover 230 are not restricted by the safety protrusion 242.

Figure 10A:
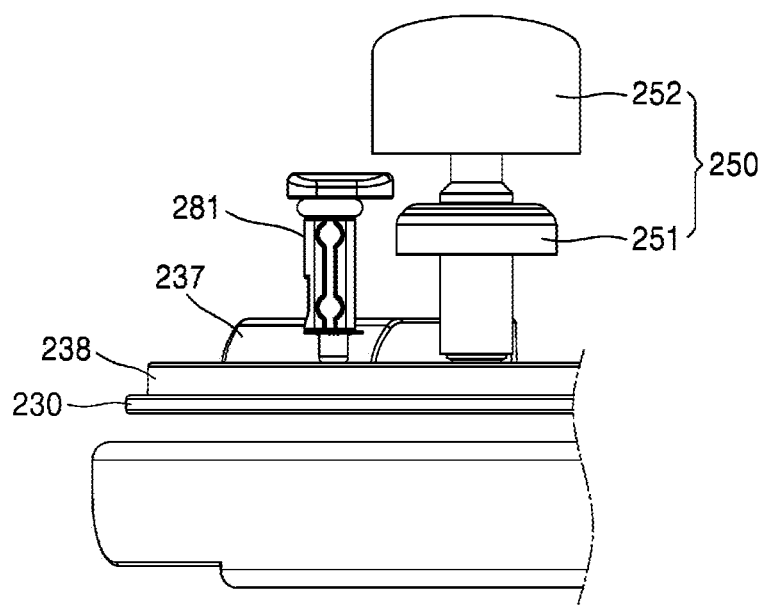
FIGS. 10A and 10B are side views illustrating a portion of the main body lid of the cooking device.
Figure 10B:
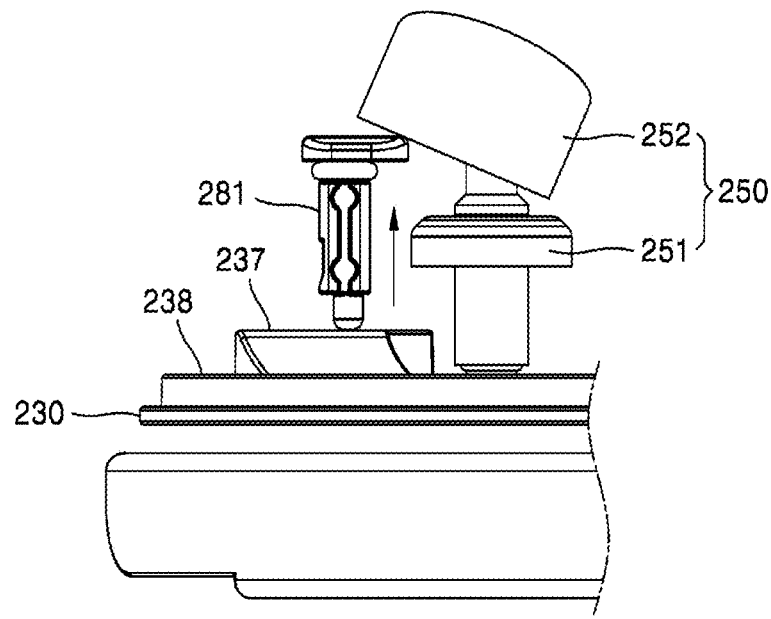

FIGS. 10A and 10B are side views illustrating a portion of the main body lid 200 of the cooking device 10, in which FIG. 10A illustrates the state when the lift pin 281 is located at a pin-down position, and FIG. 10B illustrates the state when the lift pin 281 is located at a pin-up position.

Referring to FIGS. 10A and 10B together with FIGS. 1 to 4 and 7, the cooking device 10 may include a lift pin 281 mounted on the lid frame 201 to be capable of being raised and lowered. The lift pin 281 is mounted to be movable in the vertical direction in a through-hole in the lid frame 201, and the head of the lift pin 281 may protrude from the lid frame 201. The lower end portion of the lift pin 281 may come into contact with the rotation cover 230, and may be configured to come into sliding contact with the surface of the rotation cover 230 during the rotation of the rotation cover 230.

As illustrated in FIG. 10A, when the lift pin 281 is supported on a second surface portion 238 of the rotation cover 230 at a first height level, the lift pin 281 may be located at the pin-down position. When the lift pin 281 is located at the pin-down position, the lift pin 281 may be spaced apart from the weight 252. Here, when it is described that the lift pin 281 is spaced apart from the weight 252, it may include a case where the lift pin 281 is not in physical contact with the weight 252 by being spaced apart from the weight 252 by a predetermine distance and a case where the lift pin 281 does not provide a sufficient external force to lift the weight 252 even though the lift pin 281 is in physical contact with the weight 252. At the pin-down position of the lift pin 281, steam discharge by the poise valve 250 may be determined by the steam pressure level of the accommodation space in the inner pot 110.

As illustrated in FIG. 10B, when the lift pin 281 is supported on a first surface portion 237 of the rotation cover 230 at a second height level higher than the first height level, the lift pin 281 may be located at the pin-up position. When the lift pin 281 is located at the pin-up position, the lift pin 281 is capable of lifting the weight 252 of the poise valve 250. When the weight 252 is lifted by the lift pin 281, the outlet of the flow path of the cylinder 251 of the poise valve 250 is forcibly opened regardless of the steam pressure level of the accommodation space in the inner pot 110, the steam in the accommodation space in the inner pot 110 may be discharged to the outside of the cooking device 10 through the poise valve 250.

For example, while the rotation cover 230 rotates in the first rotation direction, the contact position between the lift pin 281 and the rotation cover 230 may shift from the first surface portion 237 of the rotation cover 230 to the second surface portion 238, and the lift pin 281 may be lowered from the pin-up position to the pin-down position. In contrast, while the rotation cover 230 rotates in the second rotation direction, the contact position between the lift pin 281 and the rotation cover 230 may move from the second surface portion 238 to the first surface portion 237 of the rotation cover 230, and the lift pin 281 may be raised from the pin-down position to the pin-up position.

The lift pin 281 may be raised and lowered in conjunction with the rotation of the rotation cover 230. In exemplary embodiments, while the guide protrusion 275 moves in the locking section 2351 of the guide groove 235, the lift pin 281 may be brought into contact with the second surface portion 238 of the rotation cover 230 and may be in the pin-down state. In exemplary embodiments, while the guide protrusion 275 moves in the sliding section 2352 of the guide groove 235, the lift pin 281 may be brought into contact with the first surface portion 237 of the rotation cover 230 and may be located at the pin-up position. At this time, when the guide protrusion 275 is located at the second position P2 of the guide groove 235, the lift pin 281 may be located at the pin-up position or the pin-down position.

Figure 11A:
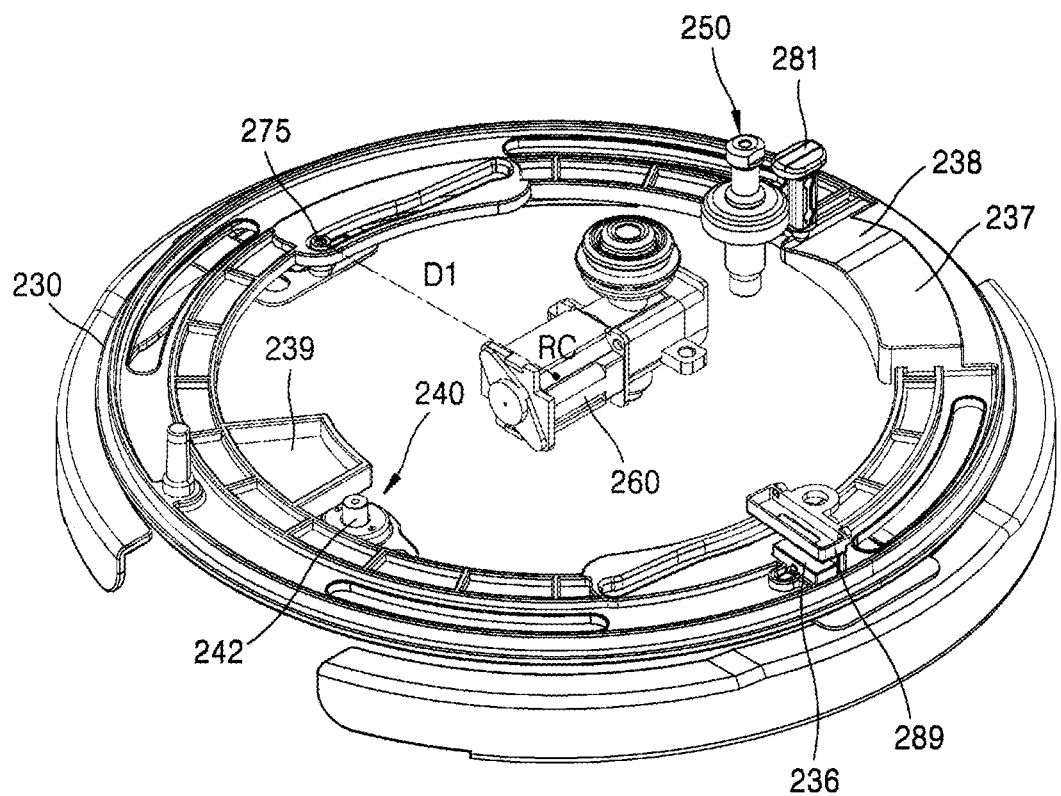
FIGS. 11A and 11B are perspective views illustrating the operation of the main body lid.
Figures 11B, 12:
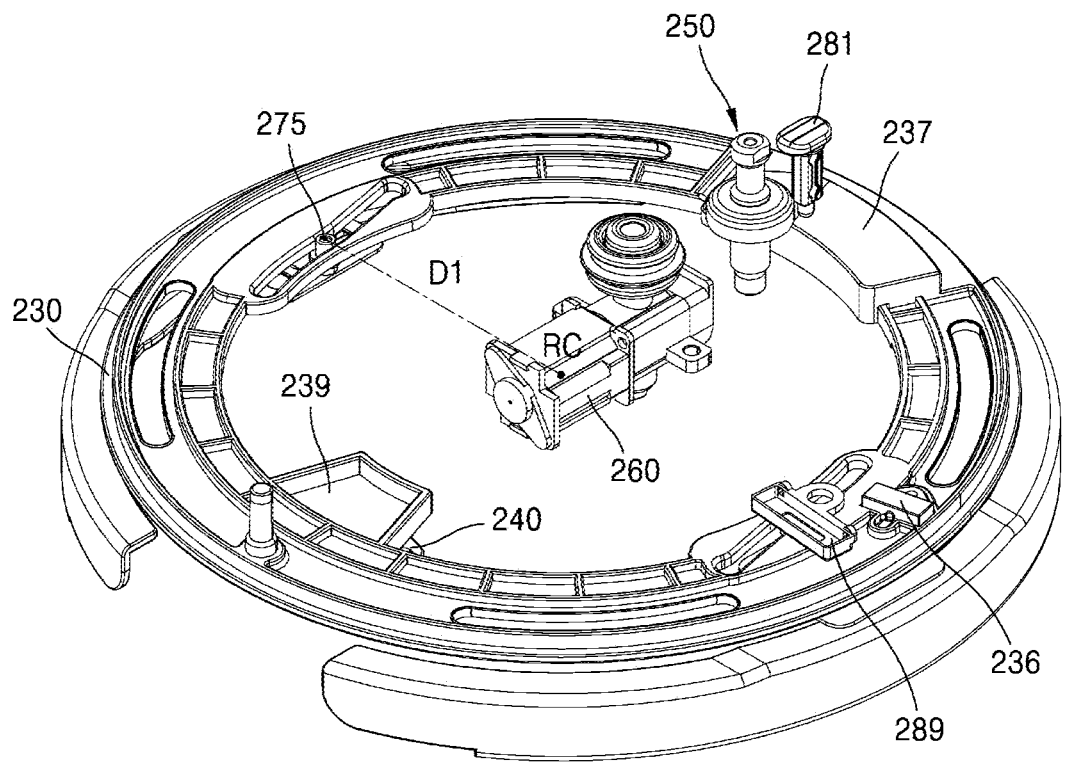
FIG. 12 is a table showing the positions of a guide protrusion, the positions of a locking structure, and the positions of a lift pin according to the change in the rotation position of a manipulation handle.

FIGS. 11A and 11B are perspective views illustrating the operation of the main body lid 200. FIG. 12 is a table showing the position of the guide protrusion 275, the position of the locking structure 270, and the position of the lift pin 281 according to the change in the rotation position of the manipulation handle 283.

Hereinafter, a method of operating the cooking device 10 including the main body lid 200 will be described with reference to FIGS. 1 to 12.

First, as illustrated in FIG. 11A, when the manipulation handle 283 is located at the first rotation position, the guide protrusion 275 is located at the first position P1 of the guide groove 235, and the locking structure 270 is located at the locking position where the engagement protrusion 277 of the locking structure 270 can be engaged with the flange 111 of the inner pot 110, as illustrated in FIG. 9A.

When the manipulation handle 283 is located at the first rotation position, the lift pin 281 supported on the second surface portion 238 of the first rotation cover 230 may be located at the pin-down position, as illustrated in FIG. 10A. In this case, steam discharge by the poise valve 250 may be determined based on the steam pressure level of the accommodation space in the inner pot 110.

When the manipulation handle 283 is located at the first rotation position so that the locking structure 270 is located at the locking position and when cooking is performed and the pressure within the inner pot 110 is relatively high (e.g., 1.2 kgf/cm$^2$ or higher), the safety protrusion 242 is brought into contact with the side wall of the safety protrusion 239 of the rotary cover 230, so that the rotation of the rotation cover 230 (e.g., the rotation of the rotation cover 230 for relatively moving the guide protrusion 275 from the first position P1 toward the second position P2 of the guide groove 235). When the pressure within the inner pot 110 is relatively low, since the safety protrusion 242 is lowered to a height where the safety protrusion 242 does not interfere with the safety protrusion 239 of the rotation cover 230, the rotation cover 230 can be rotated without interfering with the safety protrusion 242.

Referring to FIG. 11B, when the manipulation handle 283 is switched from the first rotation position to the second rotation position, the guide protrusion 275 moves from the first position P1 to the second position P2 of the guide groove 235, and the locking structure 270 is fixed at the locking position. When the manipulation handle 283 is located at the second rotation position, the lift pin 281 may be supported on the first surface portion 237 of the rotation cover 230 and may be raised from the pin-down position to the pin-up position, as illustrated in FIG. 10B. Alternatively, the lift pin 281 may be located at the pin-down position at the time when the manipulation handle 283 is located at the second rotation position, and the pin-up position where the lift pin 281 lifts the weight 252 may be reached while the guide pin moves from the second position P2 to the third position P3 of the guide groove 235 or at the time when the guide pin reaches the third position P3.

When the manipulation handle 283 is switched from the second rotation position to the third rotation position, the guide protrusion 275 may move from the second position P2 to the third position P3 of the guide groove 235 and the locking structure 270 may be slid from the locking position to the unlocking position, as illustrated in FIG. 8C. The sliding of the locking structure 270 from the locking position to the unlocking position may be implemented by an external force provided by the pressing slider 290. In addition, when the manipulation handle 283 is switched from the second rotation position to the third rotation position, the lift pin 281 may be supported on the first surface portion 237 and located at the pin-up position.

According to exemplary embodiments of the present disclosure, the locking structure 270 is configured to linearly slide in conjunction with the rotation of the rotation cover 230, and the switching of the locking structure 270 between the locking position and the unlocking position may be implemented through linear sliding of the locking structure 270. In addition, according to exemplary embodiments of the present disclosure, by including the pressing slider 290 that provides an external force for the sliding of the locking structure 270, the reproducibility and safety of the operation of the locking structure 270 can be improved.

Figure 13:
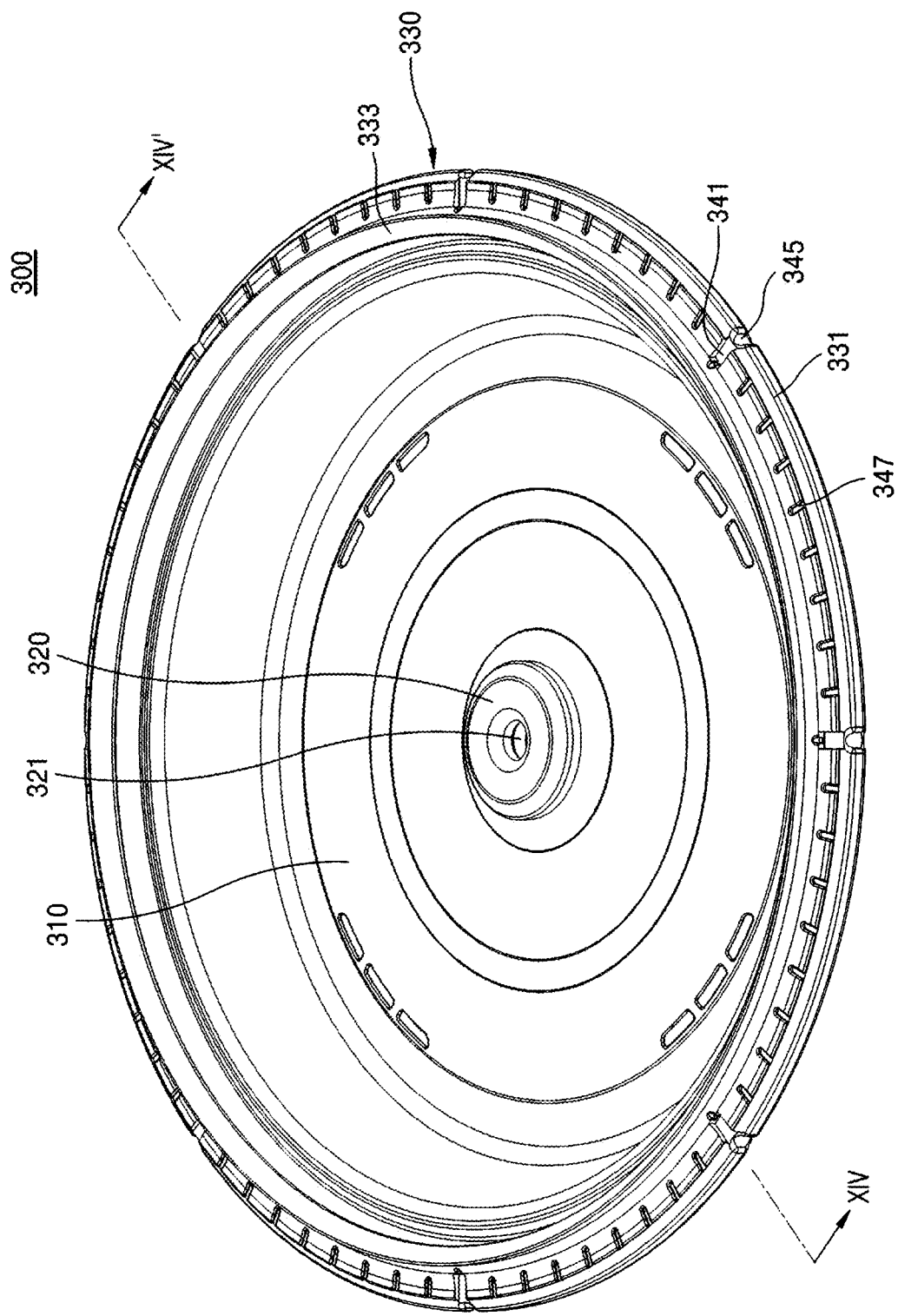
FIG. 13 is a perspective view illustrating a cover assembly for a cooking device according to exemplary embodiments of the present disclosure.
Figure 14:
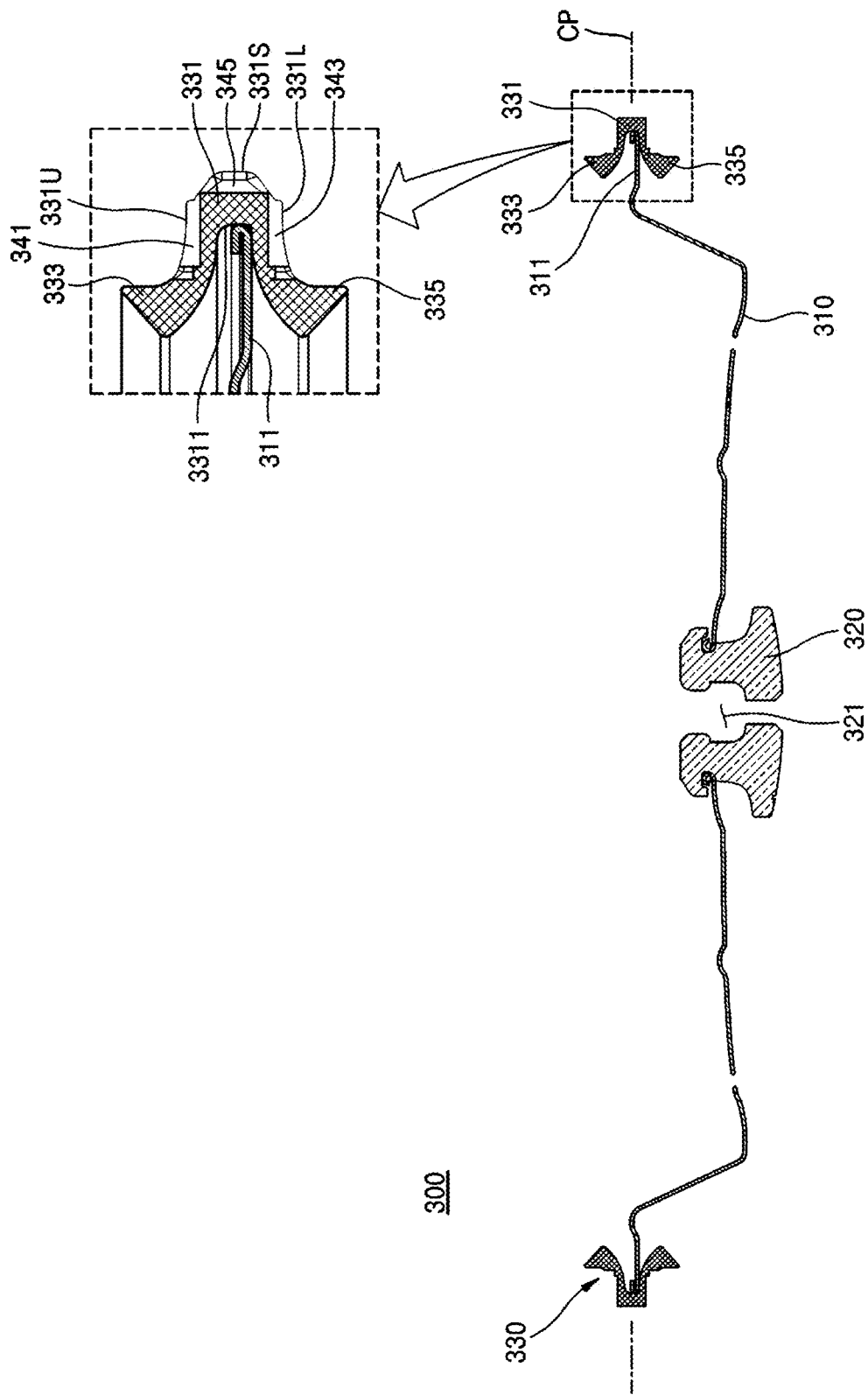
FIG. 14 is a cross-sectional view of the cover assembly taken along line XIV-XIV' in FIG. 13.
Figure 15:
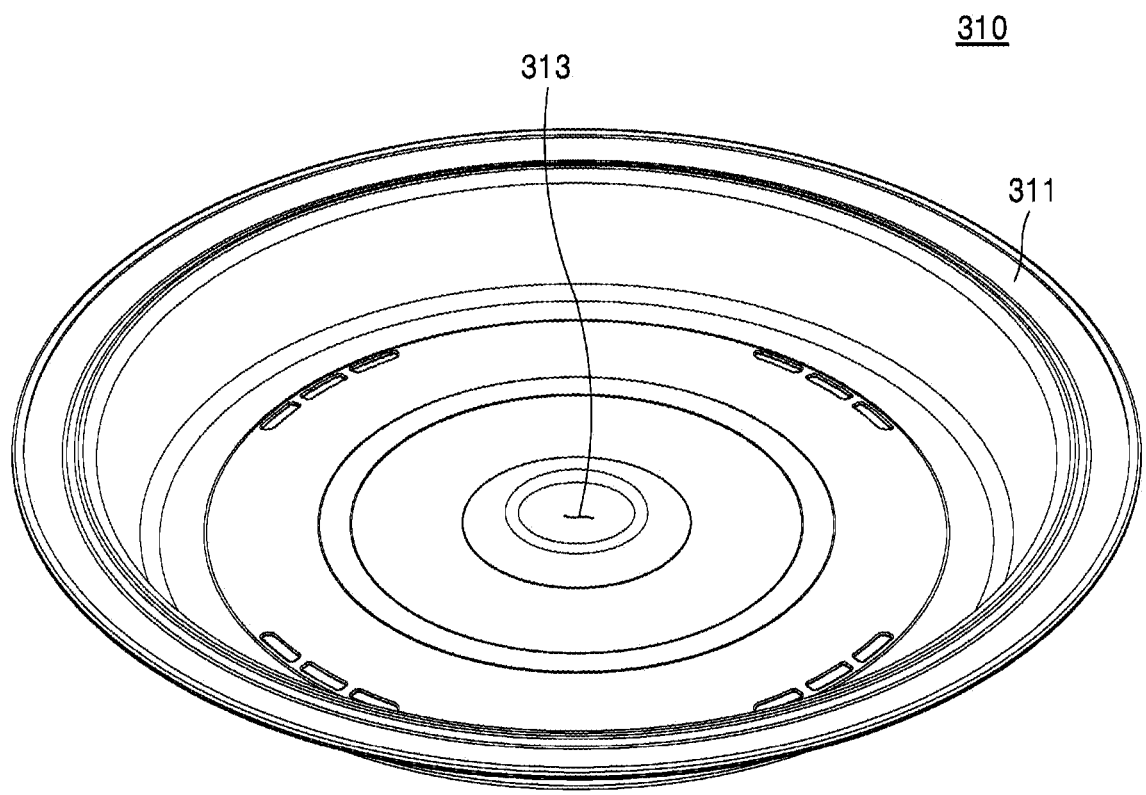
FIG. 15 is a perspective view illustrating a cover plate of the cover assembly.
Figure 16:
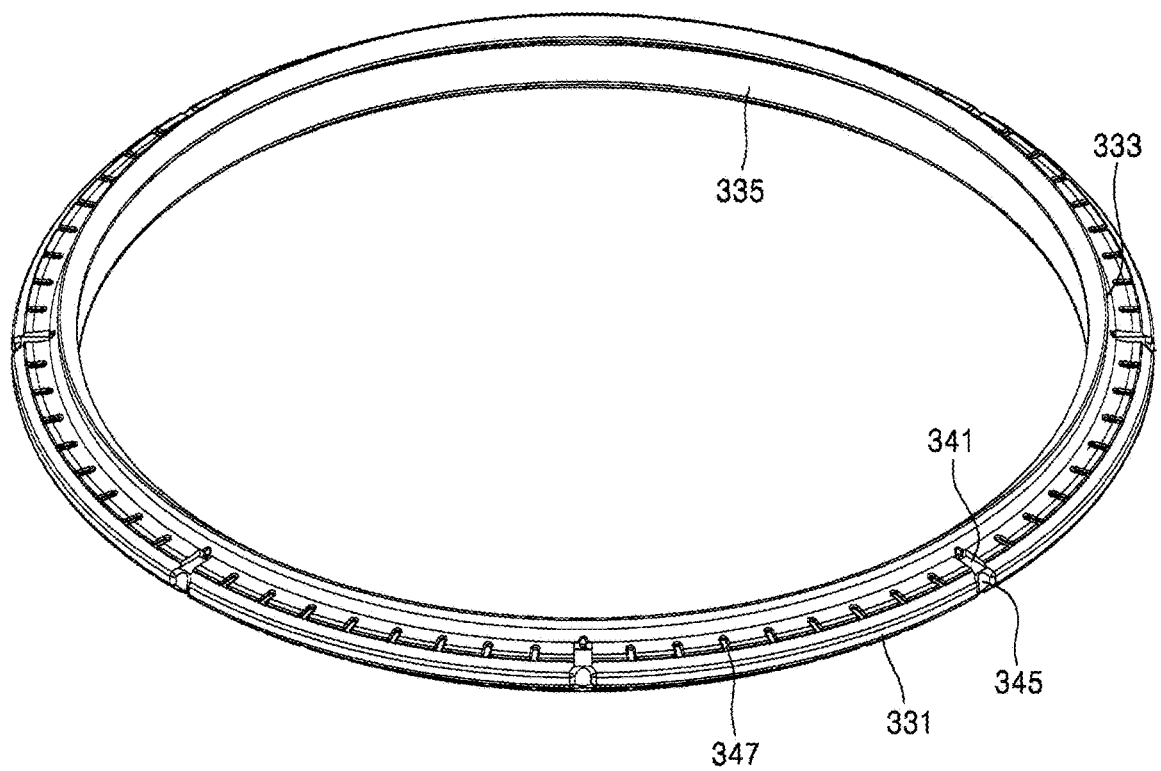
FIG. 16 is a perspective view illustrating a packing of the cover assembly.
Figure 17:
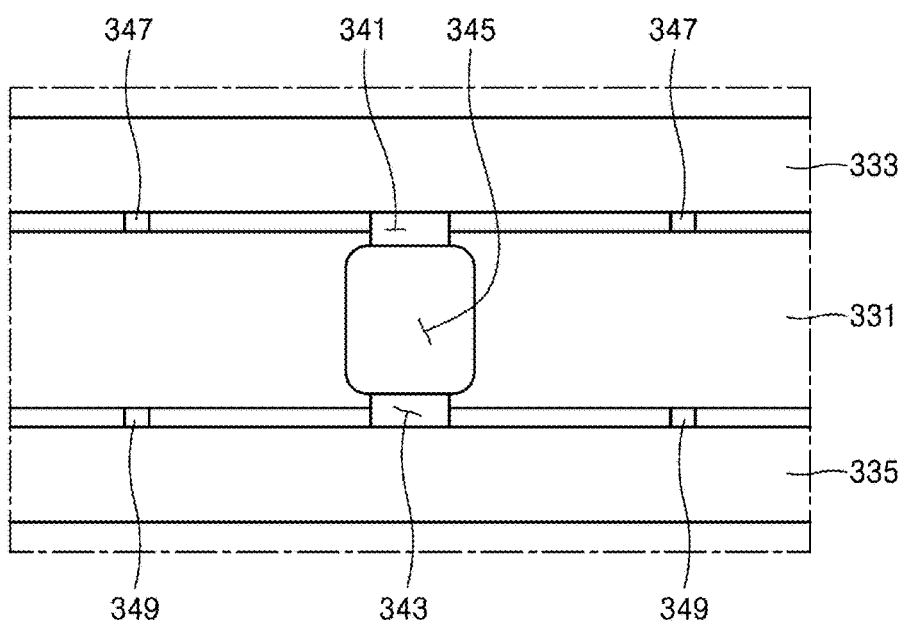
FIG. 17 is a side view illustrating the packing of the cover assembly.

FIG. 13 is a perspective view illustrating a cover assembly 300 for a cooking device according to exemplary embodiments of the present disclosure. FIG. 14 is a cross-sectional view of the cover assembly 300 taken along line XIV-XIV' in FIG. 13. FIG. 15 is a perspective view illustrating a cover plate 310 of the cover assembly 300. FIG. 16 is a perspective view illustrating a packing 330 of the cover assembly 300. FIG. 17 is a side view illustrating the packing 330 of the cover assembly 300.

Referring to FIGS. 13 to 17, the cover assembly 300 may be provided to a cooking device (10 in FIG. 1) so as to block high-temperature and high-pressure steam generated during a cooking process using the cooking device 10 from leaking. The cover assembly 300 may be detachably fastened to the main body lid (200 in FIG. 1) of the cooking appliance 10. The cover assembly 300 may be configured to seal the gap between the inner pot (110 in FIG. 1) accommodated in the main body (100 in FIG. 1) of the cooking device 10 and the top plate (210 in FIG. 1) of the main body lid 200 of the cooking device 10 by being fastened to the main body lid 200 of the cooking device 10.

The cover assembly 300 may include a cover plate 310, a handle 320, and a packing 330.

The cover plate 310 may have an appropriate shape and size to cover the inner pot 110. The cover plate 310 may have a substantially disk-like shape in a plan view. The cover plate 310 allows steam generated during the cooking process to form on the cover plate 310 so that the top plate 210 and various electrical components mounted on the top plate 210 can be protected from the steam generated during the cooking process. The cover plate 310 may include a material such as stainless steel that is lightweight and strong enough not to bend easily, but is not limited thereto.

The handle 320 may be fastened to the central portion of the cover plate 310. For example, the handle 320 may be removably fastened to the fastening hole 313 provided in the central portion of the cover plate 310. For example, fastening between the handle 320 and the cover plate 310 may be implemented by fitting a groove formed in the outer peripheral surface of the handle 320 into the body portion defining a fastening hole 313 in the cover plate 310. The upper portion of the handle 320 may protrude upward from the cover plate 310, and the lower portion of the handle 320 may protrude downward from the cover plate 310.

The handle 320 may include an insertion groove 321 into which a fixing post 282 (see FIG. 18) provided on the main body lid 200 can be fitted. For example, the fixing post 282 is in the form of a column extending downward from the bottom of the top plate 210, and the insertion groove 321 in the handle 320 extends downward from the top surface of the handle 320 and may have a size and shape suitable for fitting the fixing post 282 thereinto. The cover assembly 300 may be coupled to the main body lid 200 by fitting the fixing post 282 into the insertion groove 321 in the handle 320. Then, by separating the fixing post 282 from the insertion groove 321 in the handle 320, the cover assembly 300 may be removed from the main body lid 200. In order to separate the cover assembly 300 from the main body lid 200, a user may remove the cover plate 310 from the main body lid 200 by holding the lower portion of the handle 320 protruding from the bottom of the cover plate 310 and applying an external force acting downward.

The handle 320 may include an elastically deformable material. For example, the handle 320 may include a material such as silicone rubber or synthetic rubber, but is not limited thereto.

The packing 330 may be removably fastened to the circumference of the cover plate 310. The packing 330 may have a ring shape continuously extending along the circumference of the cover plate 310 and may be in continuous contact with the circumference of the cover plate 310. In exemplary embodiments, the cover plate 310 may have a flat plate shape in which the outer peripheral portion 311 thereof extends in a direction away from the center of the cover plate 310 or in a radial direction, and a fastening groove 3311 that accommodates the outer peripheral portion 311 of the cover plate 310 may be provided in the inner surface of the packing 330. The fastening groove 3311 in the packing 330 may extend continuously along the circumference of the cover plate 310, and the fastening between the cover plate 310 and the packing 330 can be implemented by fitting the outer peripheral portion 311 of the cover plate 310 into the fastening groove 3311 provided in the inner surface of the packing 330.

For example, the packing 330 may include an elastically deformable material. For example, the packing 330 may include a material such as silicone rubber or synthetic rubber, but is not limited thereto.

The packing 330 may include a central body 331, an upper close contact protrusion 333, and a lower close contact protrusion 335.

The central body 331 of the packing 330 is a portion that comes into contact with the cover plate 310 and may have a ring shape continuously extending along the circumference of the cover plate 310 in a plan view. The fastening groove 3311 into which the outer peripheral portion 311 of the cover plate 310 is fixedly inserted may be provided in the inner surface of the central body 331. The central body 331 may include an upper portion extending from the top surface of the outer peripheral portion 311 of the cover plate 310, a lower portion extending from the bottom surface of the outer peripheral portion 311 of the cover plate 310, and a side portion interconnecting the upper and lower portions.

The upper close contact protrusion 333 may extend inward from the central body 331 (i.e., in a direction toward the center of the packing 330 or the center of the cover plate 310) to be inclined upward, and the lower close contact protrusion 335 may extend inward from the central body 331 (i.e., in a direction toward the center of the packing 330 or the center of the cover plate 310) to be inclined downward. The upper close contact protrusion 333 may overlap the outer peripheral portion 311 of the cover plate 310 in the vertical direction and may be provided on the top surface of the outer peripheral portion 311 of the cover plate 310. The lower close contact protrusion 335 may overlap the outer peripheral portion 311 of the cover plate 310 in the vertical direction and may be provided on the bottom surface of the outer peripheral portion 311 of the cover plate 310.

The packing 330 may have a vertically symmetrical structure. That is, the packing 330 may have a vertically symmetrical structure with respect to a center plane CP passing through the center in the vertical direction or height direction of the packing 330 (e.g., a mirror shape symmetrical with respect to the center plane CP passing through the center in the vertical direction or height direction of the packing 330). In this case, since the vertical directivity of the packing 330 is eliminated, assembly between the packing 330 and the cover plate 310 can be made easier.

The upper close contact protrusion 333 may have a shape that is bent upward or protrudes upward from the end portion of the central body 331. The upper close contact protrusion 333 has a ring shape that extends continuously along the ring-shaped central body 331 or the circumference of the cover plate 310 in a plan view, and may be configured to come into continuous contact with the top plate 210 along the extending direction thereof. When the cover assembly 300 is mounted on the cooking device 10, the external force acting downward from the contact surface between the upper close contact protrusion 333 and the top plate 210 is applied to the upper close contact protrusion 333 of the packing 330 so that the upper portion of the packing 330 (i.e., the portion of the packing 330 on the outer peripheral portion 311 of the cover plate 310) can be elastically deformed. Due to the elastic restoring force of the elastically deformed packing 330, the upper close contact protrusion 333 may be in close contact with the top plate 210. The upper close protrusion 333 is capable of being in close contact with the top plate 210 to prevent a gap from being formed between the top plate 210 and the packing 330 and is capable of blocking steam generated during a cooking process using the cooking device 10 from leaking through the gap between the top plate 210 and the packing 330.

The lower close contact protrusion 335 may have a shape that is bent downward or protrudes downward from the end portion of the central body 331. The lower close contact protrusion 335 has a ring shape that extends continuously along the ring-shaped central body 331 or the circumference of the cover plate 310 in a plan view, and may be configured to come into continuous contact with the inner pot 110 along the extending direction thereof. When the cover assembly 300 is mounted on the cooking device 10, the external force acting upward from the contact surface between the lower close contact protrusion 335 and the inner pot 110 is applied to the lower close contact protrusion 335 of the packing 330 so that the lower portion of the packing 330 (i.e., the portion of the packing 330 under the outer peripheral portion 311 of the cover plate 310) can be elastically deformed. Due to the elastic restoring force of the elastically deformed packing 330, the lower close contact protrusion 335 may be in close contact with the inner pot 110. The lower close contact protrusion 335 is capable of being in close contact with the inner pot 110 to prevent a gap from being formed between the inner pot 110 and the packing 330 and is capable of blocking steam generated during a cooking process by using the cooking device 10 from leaking through the gap between the inner pot 110 and the packing 330.

The packing 330 may include at least one upper air groove 341 provided in the top surface 331U of the central body 331 (i.e., the surface facing the top plate 210). The at least one upper air groove 341 may generally extend in a direction away from the center of the cover plate 310 or in a radial direction, and may extend generally linearly. The upper air groove 341 is not formed in the upper close contact protrusion 333, which is in continuous contact with the top plate 210 to form a continuous sealed section between the packing 330 and the top plate 210. For example, the upper air groove 341 may linearly extend from an end portion spaced apart from the contact portion between the upper close contact protrusion 333 and the top plate 210 to an outer surface 331S of the central body 331.

For example, the packing 330 may include one upper air groove 341 or may include a plurality of upper air grooves 341 spaced apart from each other along the circumferential direction of the packing 330. When the packing 330 includes the plurality of upper air grooves 341, the plurality of upper air grooves 341 may be spaced apart from each other at an even interval. That is, the distance in the circumferential direction between two neighboring upper air grooves 341 may be constant.

The packing 330 may include at least one lower air groove 343 provided in the bottom surface 331L of the central body 331 (i.e., the surface facing the inner pot 110). The at least one lower air groove 343 may generally extend in a direction away from the center of the cover plate 310 or in a radial direction, and may extend generally linearly. The lower air groove 343 is not formed in the lower close contact protrusion 335, which is in continuous contact with the inner port 110 to form a continuous sealed section between the packing 330 and the inner plate 110. For example, the lower air groove 343 may linearly extend from an end portion spaced apart from the contact portion between the lower close contact protrusion 335 and the inner pot 110 to an outer surface 331S of the central body 331.

For example, the packing 330 may include one lower air groove 343 or may include a plurality of lower air grooves 343 spaced apart from each other along the circumferential direction of the packing 330. When the packing 330 includes the plurality of lower air grooves 343, the plurality of lower air grooves 343 may be spaced apart from each other at an even interval. That is, the distance in the circumferential direction between two neighboring lower air grooves 343 may be constant.

The packing 330 may further include a connection groove 345 extending from one end portion of the upper air groove 341 provided in the top surface 331U of the central body 331 to one end portion of the lower air groove 343 provided in the bottom surface 331L of the central body 331. The connection groove 345 may be provided in the outer surface 331S of the central body 331 and may extend in a generally vertical direction to connect the upper air groove 341 and the lower air groove 343 to each other. Since the upper air groove 341 and the lower air groove 343 are connected to each other via the connection groove 345, the packing 330 may be provided with a groove that starts from a point in the lower portion of the packing 330 adjacent to the lower close contact protrusion 335 and continuously extends to a point on the upper portion of the packing 330 adjacent to the upper close contact protrusion 333.

The packing 330 may include at least one upper auxiliary groove 347 provided in the top surface 331U of the central body 331 (i.e., the surface facing the top plate 210). The at least one upper auxiliary groove 347 may generally extend in a direction away from the center of the cover plate 310 or in a radial direction, and may extend generally linearly. The upper auxiliary groove 347 is not formed in the upper close contact protrusion 333, which is in continuous contact with the top plate 210 to form a continuous sealed section between the packing 330 and the top plate 210. For example, the upper auxiliary groove 347 may extend from a point spaced apart from the upper close contact protrusion 333 by a predetermined distance or from the boundary between the central body 331 and the upper close contact protrusion 333 toward the outer surface 331S of the central body 331.

For example, the packing 330 may include one upper auxiliary groove 347 or may include a plurality of upper auxiliary grooves 347 spaced apart from each other along the circumferential direction of the packing 330. For example, a plurality of upper auxiliary grooves 347 may be provided between two upper air grooves 341 neighboring each other in the circumferential direction of the packing 330.

The depth of the upper auxiliary groove 347 may be smaller than the depth of the upper air groove 341, and the horizontal width (i.e., the width along the circumferential direction of the packing 330) and the extending length (i.e., the length extending in the radial direction of the packing 330 or in the direction away from the center of the packing 330) of the upper auxiliary groove 347 may be smaller than the horizontal width and the extending length of the upper air groove 341, respectively.

The packing 330 may include at least one lower auxiliary groove 349 provided in the bottom surface 331L of the central body 331 (i.e., the surface facing the inner pot 110). The at least one lower auxiliary groove 349 may generally extend in a direction away from the center of the cover plate 310 or in a radial direction, and may extend generally linearly. The lower auxiliary groove 349 is not formed in the lower close contact protrusion 335, which is in continuous contact with the inner port 110 to form a continuous sealed section between the packing 330 and the inner plate 110. For example, the lower auxiliary groove 349 may extend from a point spaced apart from the lower close contact protrusion 335 by a predetermined distance or from the boundary between the central body 331 and the lower close contact protrusion 335 toward the outer surface 331S of the central body 331.

For example, the packing 330 may include one lower auxiliary groove 349 or may include a plurality of lower auxiliary grooves 349 spaced apart from each other along the circumferential direction of the packing 330. For example, a plurality of lower auxiliary grooves 349 may be provided between two lower air grooves 343 neighboring each other in the circumferential direction of the packing 330.

The depth of the lower auxiliary groove 349 may be smaller than the depth of the lower air groove 343, and the horizontal width (i.e., the width along the circumferential direction of the packing 330) and the extending length (i.e., the length extending in the radial direction of the packing 330 or in the direction away from the center of the packing 330) of the lower auxiliary groove 349 may be smaller than the horizontal width and the extending length of the lower air groove 343, respectively.

Unlike the upper air groove 341 and the lower air groove 343 connected to each other via the connection groove 345, the upper auxiliary groove 347 and lower auxiliary groove 349 may not be connected to each other.

When the packing 330 has a vertically symmetrical structure, the number and arrangement of upper air grooves 341 (e.g., the interval between neighboring upper air grooves 341) may be the same as the number and arrangement of the lower air grooves 343, and the number and arrangement of upper auxiliary grooves 347 may be the same as the number and arrangement of lower auxiliary grooves 349.

Figure 18:
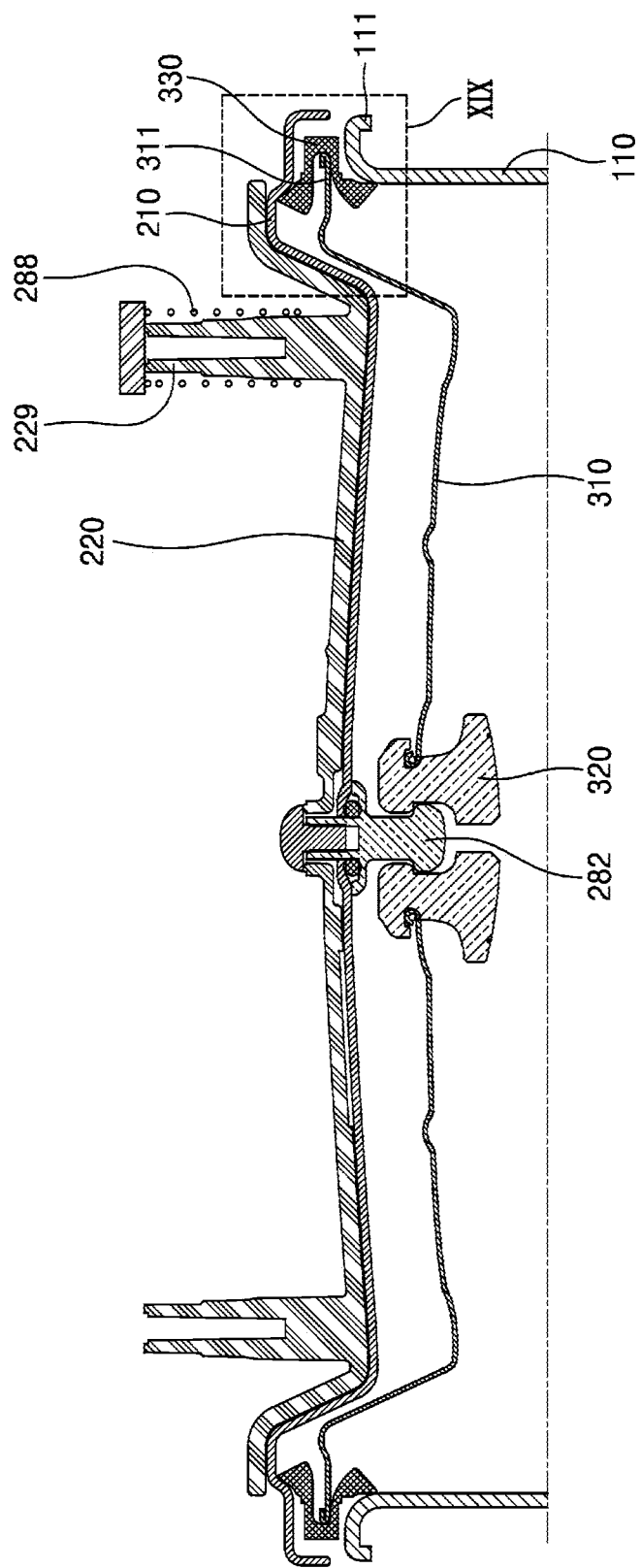
FIG. 18 is a cross-sectional view illustrating a portion of a cooking device including the cover assembly.
Figure 19:
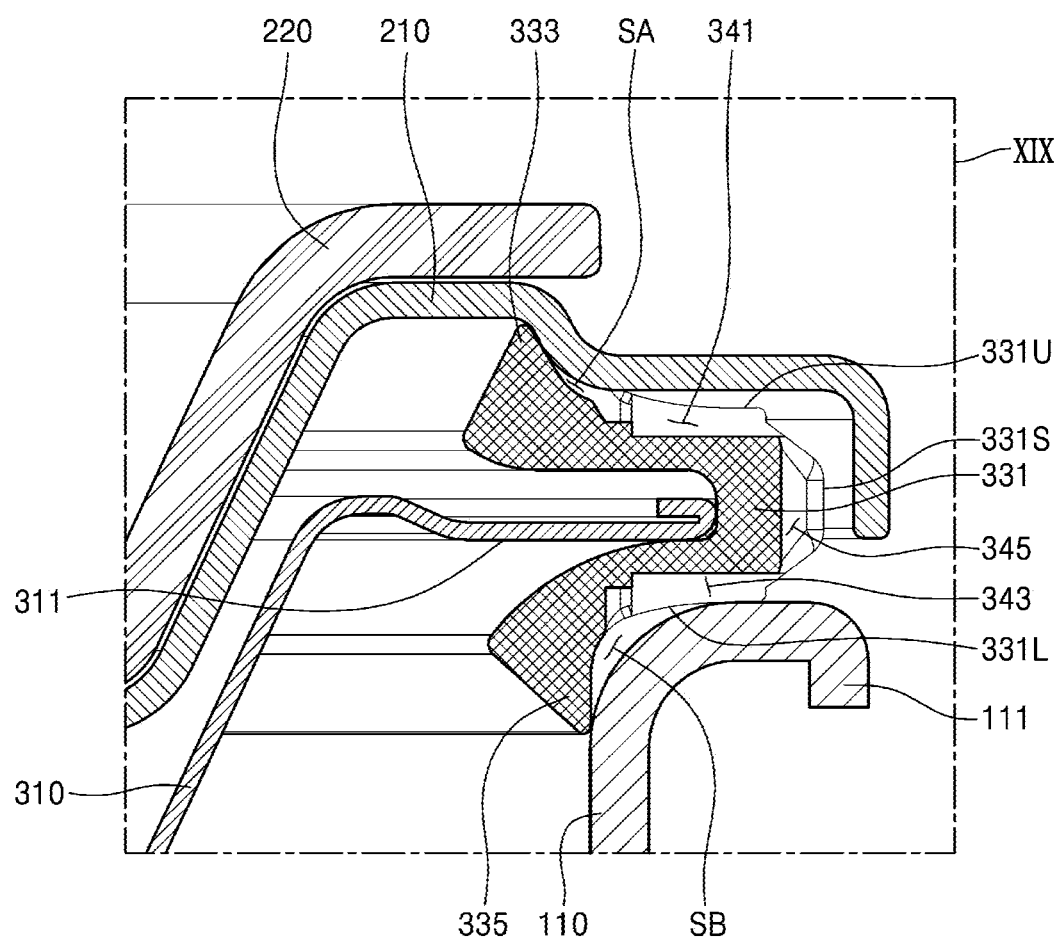
FIG. 19 is an enlarged view illustrating the area indicated by "XIX" in FIG. 18.

FIG. 18 is a cross-sectional view illustrating a portion of a cooking device including the cover assembly 300. FIG. 19 is an enlarged view illustrating the area indicated by "XIX" in FIG. 18.

Referring to FIGS. 18 and 19 together with FIGS. 1 and 13 to 17, the cover assembly 300 may be removably fastened to the main body lid 200. The cover assembly 300 may be fastened to the main body lid 200 by inserting the fixing post 282 protruding downward from the top plate 210 into the insertion groove 321 in the handle 320. When the cover assembly 300 is fastened to the main body lid 200, the cover assembly 300 may move together with the top plate 210 when the top plate 210 moves. When the cover assembly 300 is fastened to the main body lid 200, the packing 330 of the cover assembly 300 is disposed between the top plate 210 and the inner pot 110 and blocks steam from leaking through the gap between the top plate 210 and the inner pot 110. For example, the packing 330 of the cover assembly 300 may be configured to block steam from leaking through the gap between the top plate 210 and the inner pot 110 by being compressed between the top plate 210 and the inner pot 110.

While cooking is in progress in the cooking device 10, when the upper close contact protrusion 333 is in close contact with the top plate 210, a first space SA surrounded by the upper portion of the packing 330 and the top plate 210 may be formed near the contact portion between the upper close contact protrusion 333 and the top plate 210. The first space SA may include a space between the top surface 331U of the central body 331 and the top plate 210. The upper air groove 341 provided in the surface of the packing 330 facing the top plate 210 makes the external space outside the packing 330 or outside the inner pot 110 communicate with the first space SA to allow air to flow between the first space SA and the external space outside the packing 330 or outside the inner pot 110.

As a comparative example, when the packing 330 does not have the upper air groove 341, a vacuum may be formed in the first space SA while cooking is in progress in the cooking device 10. In this case, the packing 330 may be strongly attached to the top plate 210 and thus the force required to separate the packing 330 and the top plate 210 from each other after cooking is completed may increase, and the packing 330 may be deformed and worn by the force applied to the packing 330 in order to separate the packing 330 and the top plate 210 from each other. Due to this deformation and wear of the packing 330, the sealing performance of the packing 330 may deteriorate.

In addition, while cooking is in progress in the cooking device 10, when the lower close contact protrusion 335 is in close contact with the inner pot 110, a second space SB surrounded by the lower portion of the packing 330 and the inner pot 110 may be formed. The second space SB may include a space between the bottom surface 331L of the central body 331 and the inner pot 110. The lower air groove 343 provided in the surface of the packing 330 facing the inner pot 110 makes the external space outside the packing 330 or outside the inner pot 110 communicate with the second space SB to allow air to flow between the second space SB and the external space outside the packing 330 or outside the inner pot 110.

As a comparative example, when the packing 330 does not have the lower air groove 343, a vacuum may be formed in the second space SB while cooking is in progress in the cooking device 10. In this case, since the packing 330 is strongly attached to the inner pot 110, the force required to separate the packing 330 and the inner pot 110 from each other increases when opening the main body lid 200, and the packing 330 may be deformed and worn by the force applied to the packing 330 in order to separate the packing 330 and the inner pot 110 from each other. Due to this deformation and wear of the packing 330, the sealing performance of the packing 330 may deteriorate.

However, in embodiments of the present disclosure, since the upper air groove 341 allows air to flow between the first space SA and the external space outside the packing 330 and the lower air groove 343 allows air to flow between the second space SB and the external space outside the packing 330 while cooking is in progress in the cooking device 10, it is possible to prevent a vacuum from being formed in the first space SA and/or the second space SB. Accordingly, deformation and wear of the packing 330 that may be caused by a vacuum formed in the first space SA and/or the second space SB can be prevented.

In addition, in embodiments of the present disclosure, the upper auxiliary groove 347 provided in the surface of the packing 330 facing the top plate 210 may function to further suppress a vacuum from being formed between the upper portion of the packing 330 and the top plate 210 together with the upper air groove 341, and the lower auxiliary groove 349 provided in the surface of the packing 330 facing the inner pot 110 may function to further suppress a vacuum from being formed between the lower portion of the packing 330 and the inner pot 110 together with the lower air groove 343.

In exemplary embodiments, the cooking device 10 may include a spring 288 provided on the top plate 210 and configured to provide a downward elastic restoring force. The spring 288 is mounted, for example, on a support column 229 provided on the top plate 210 and may provide an elastic restoring force that presses the top plate 210 downward. That is, the spring 288 may be configured to elastically support the top plate 210 in a direction from the raised position of the top plate 210 toward the lowered position. The spring 288 may include, for example, a compression spring 288. A plurality of springs 288, which are arranged symmetrically with respect to the center of the top plate 210, may be provided on the top plate 210 such that the elastic restoring force provided by the springs 288 acts generally uniformly on the entire top plate 210.

The springs 288 prevent the top plate 210 and/or the main body lid 200 from being deformed and damaged by absorbing the force acting on the top plate 210 and/or the main body lid 200 when the pressure in the inner pot 110 is high. Furthermore, the springs 288 may elastically support the top plate 210 and the packing 330 in a direction from the raised position of the top plate 210 toward the lowered position. In this case, the packing 330 disposed between the top plate 210 and the inner pot 110 may be compressed by the elastic restoring force provided by the springs 288. Due to the elastic restoring force provided by the springs 288, even when the pressure within the inner pot 110 is high, the packing 330 disposed between the inner pot 110 and the top plate 210 may be compressed to an appropriate level.

According to exemplary embodiments of the present disclosure, the cover assembly 300 is removably fastened to the main body lid 200 of the cooking device 10, and the packing 330 of the cover assembly 300 prevents a vacuum from being formed in the space between the packing 330 and the top plate 210 and in the space between the packing 330 and the inner pot 110 so that an excessive external force can be prevented from being applied to the packing 330 in the process of separating the packing 330 from the main body lid 200 and/or the inner pot 110. Accordingly, deformation and wear of the packing 330 is prevented so that the sealing performance of the packing 330 can be improved and ultimately the cooking quality of the cooking device 10 can be improved.

As described above, exemplary embodiments have been disclosed in the drawings and specification. The embodiments have been described by using specific terms in the present specification, but the terms have only been used for the purpose of describing the technical ideas of the present disclosure, and are not used to limit the meaning of the terms or the scope of the present disclosure defined in the claims. Therefore, a person ordinarily skilled in the art will understand that various modifications and equivalent other embodiments are possible from the embodiments. Therefore, the true technical scope of protection of the present disclosure should be determined based on the technical ideas of the appended claims.

What is claimed is:

1. A cooking device comprising:
    a main body;
    an inner pot accommodated in the main body; and
    a main body lid connected to the main body and configured to cover the inner pot,
    wherein the main body lid comprises:
        a top plate configured to cover the inner pot;
        a support plate disposed on the top plate;
        a rotation cover including a guide groove extending in a curved shape along a rotation direction, and disposed on the top plate to be rotatable along a circumference of the top plate;
        a locking structure comprising an engagement protrusion configured to be engaged with a flange of the inner pot, a connection plate connected to a body of the engagement protrusion and a guide protrusion inserted into the guide groove, wherein the locking structure is configured to linearly move between a locking position and an unlocking position in conjunction with the rotation of the rotation cover, wherein the locking position is a position where the engagement protrusion overlaps the flange of the inner pot in a vertical direction and the unlocking position is a position that is spaced apart outward from the locking position in a radial direction; and
        a pressing slider configured to elastically support the locking structure in a direction from the locking position toward the unlocking position,
    wherein the pressing slider comprises:
        a fixed body configured to be engaged with the support plate;
        a movable body including an engagement hook engaged with an engagement block of the fixed body and configured to move linearly within the fixed body, wherein the movable body is in contact with the locking structure; and
        a spring provided between the fixed body and the movable body to provide a restoring force to move the movable body in a direction away from a center of the rotation cover.

2. The cooking device of claim 1, wherein the guide groove comprises a first section spaced apart from the center of the rotation cover by a first distance and a second section spaced apart from the center of the rotation cover by a distance greater than the first distance,
    the locking structure is located at the locking position while the guide protrusion is located within the first section of the guide groove, and
    the locking structure moves between the locking position and the unlocking position while the guide protrusion moves within the second section of the guide groove.

3. The cooking device of claim 2, further comprising:
    a poise valve comprising a cylinder comprising a flow path communicating with an accommodation space in the inner pot, and a weight configured to open/close the flow path in the cylinder depending on a steam pressure within the inner pot; and
    a lift pin configured to be raised and lowered between a pin-down position and a pin-up position depending on the rotation angle of the rotation cover,
    wherein the lift pin is located at the pin-up position to lift the weight such that an outlet of the flow path in the cylinder is forcibly opened.

4. The cooking device of claim 3, wherein the lift pin is located at the pin-down position while the guide protrusion moves within the first section of the guide groove, and
    wherein the lift pin is located at the pin-up position while the guide protrusion moves within the second section of the guide groove.

5. The cooking device of claim 1, further comprising:
    a cover assembly removably fastened to the main body lid,
    wherein the main body lid further comprises a fixing post protruding downward from the top plate, and
    wherein the cover assembly comprises:
        a cover plate configured to cover the inner pot;
        a packing coupled to a circumference of the cover plate, having a ring shape extending along the circumference of the cover plate, and disposed between the inner pot and the top plate, wherein the packing is configured to seal a gap between the inner pot and the top plate; and
        a handle provided in a central portion of the cover plate and comprising an insertion groove into which the fixing post is inserted, and
    wherein the packing comprises:
        a ring-shaped central body comprising a fastening groove into which the cover plate is fitted, and extending along the circumference of the cover plate;
        an upper close contact protrusion extending inward from the central body to be inclined upward and having a ring shape extending along the central body, wherein the upper close contact protrusion is in continuous contact with the top plate;
a lower close contact protrusion extending inward from the central body to be inclined downward and having a ring shape extending along the central body, wherein the lower close contact protrusion is in continuous contact with the inner pot;
at least one upper air groove provided on a top surface of the central body; and
at least one lower air groove provided in a bottom surface of the central body.

* * * * *